(12) United States Patent
Inagaki et al.

(10) Patent No.: US 10,738,189 B2
(45) Date of Patent: Aug. 11, 2020

(54) RESIN COMPOSITION, METHOD OF PRODUCING RESIN COMPOSITION, AND SHAPED PRODUCT

(71) Applicant: ASAHI KASEI KABUSHIKI KAISHA, Chiyoda-ku, Tokyo (JP)

(72) Inventors: Nozomi Inagaki, Tokyo (JP); Kazuyuki Ogata, Tokyo (JP)

(73) Assignee: ASAHI KASEI KABUSHIKI KAISHA, Chiyoda-ku, Tokyo (JP)

(*) Notice: Subject to any disclaimer, the term of this patent is extended or adjusted under 35 U.S.C. 154(b) by 0 days.

(21) Appl. No.: 16/099,690

(22) PCT Filed: May 24, 2017

(86) PCT No.: PCT/JP2017/019438
§ 371 (c)(1),
(2) Date: Nov. 8, 2018

(87) PCT Pub. No.: WO2017/208945
PCT Pub. Date: Dec. 7, 2017

(65) Prior Publication Data
US 2019/0185665 A1    Jun. 20, 2019

(30) Foreign Application Priority Data
May 31, 2016    (JP) .................................. 2016-109406

(51) Int. Cl.
*C08L 71/12*    (2006.01)
*C08K 5/521*    (2006.01)
(Continued)

(52) U.S. Cl.
CPC ............... *C08L 71/12* (2013.01); *C08J 3/005* (2013.01); *C08K 5/521* (2013.01); *C08K 5/5313* (2013.01);
(Continued)

(58) Field of Classification Search
CPC ............... C08L 2205/035; C08L 23/00; C08L 23/0815; C08L 53/00; C08L 53/025; C08L 71/12; C08J 3/005
See application file for complete search history.

(56) References Cited

U.S. PATENT DOCUMENTS 8,278,376 B2    10/2012    Qiu et al.
2004/0102551 A1    5/2004    Sato et al.
(Continued)

FOREIGN PATENT DOCUMENTS

CN    1561371 A    1/2005
CN    102272204 A    12/2011
(Continued)

OTHER PUBLICATIONS

Tafmer datasheet (Year: 2005).*
(Continued)

*Primary Examiner* — Mark S Kaucher
(74) *Attorney, Agent, or Firm* — Kenja IP Law PC

(57) ABSTRACT

Provided are a resin composition and shaped product having excellent low-temperature impact resistance, chemical resistance, and tracking resistance, and having rigidity enabling adoption for mechanism components and structures. The resin composition contains (a) a polyphenylene ether resin, and further contains: (b-1) a hydrogenated block copolymer, and/or modified product thereof, having a peak molecular weight of 80,000 to 200,000 and (b-2) a hydrogenated block copolymer, and/or modified product thereof, having a peak molecular weight of at least 10,000 and less than 80,000; and/or (c) an olefinic polymer formed from an olefin other than propylene. The (a) component forms a continuous phase, polymer block B has a glass transition temperature of −50° C. or lower, the (c) component has a brittleness temperature of −50° C. or lower, and the composition does not substantially contain (g) polypropylene resin and has a
(Continued)

flexural modulus of 1,600 MPa or more as measured in accordance with ISO 178.

16 Claims, 1 Drawing Sheet

(51) Int. Cl.

| | |
|---|---|
| *C08K 5/5313* | (2006.01) |
| *C08L 53/00* | (2006.01) |
| *C08L 23/00* | (2006.01) |
| *C08J 3/00* | (2006.01) |
| *C08L 23/08* | (2006.01) |
| *C08L 53/02* | (2006.01) |

(52) U.S. Cl.
CPC ........... *C08L 23/00* (2013.01); *C08L 23/0815* (2013.01); *C08L 53/00* (2013.01); *C08L 53/025* (2013.01); *C08L 2205/035* (2013.01)

(56) References Cited

U.S. PATENT DOCUMENTS

| | | | |
|---|---|---|---|
| 2004/0235993 A1* | 11/2004 | Yoshida | C08K 5/523 524/115 |
| 2005/0154100 A1* | 7/2005 | Kosaka | C08L 71/12 524/115 |
| 2010/0119746 A1 | 5/2010 | Igarashi et al. | |
| 2010/0179290 A1 | 7/2010 | Lietzau et al. | |
| 2013/0231433 A1 | 9/2013 | Date | |
| 2016/0237277 A1 | 8/2016 | I et al. | |
| 2019/0284382 A1* | 9/2019 | Tuberquia | C08K 5/01 |

FOREIGN PATENT DOCUMENTS

| | | |
|---|---|---|
| EP | 0358898 A2 | 3/1990 |
| EP | 3053955 A1 | 8/2016 |
| EP | 3088469 A1 | 11/2016 |
| JP | H02110147 A | 4/1990 |
| JP | H0428738 A | 1/1992 |
| JP | H073083 A | 1/1995 |
| JP | 2000007908 A | 1/2000 |
| JP | 2000280407 A | 10/2000 |
| JP | 2004161929 A | 6/2004 |
| JP | 2004517998 A | 6/2004 |
| JP | 2004262149 A | 9/2004 |
| JP | 2004292660 A | 10/2004 |
| JP | 2004307624 A | 11/2004 |
| JP | 2004315649 A | 11/2004 |
| JP | 2005344065 A | 12/2005 |
| JP | 2007519782 A | 7/2007 |
| JP | 2010254994 A | 11/2010 |
| JP | 2013237869 A | 11/2013 |
| JP | 5422561 B2 | 2/2014 |
| JP | 2014101399 A | 6/2014 |
| WO | 02057363 A2 | 7/2002 |
| WO | 2008093648 A1 | 8/2008 |
| WO | 2011135927 A1 | 11/2011 |
| WO | 2014075291 A1 | 5/2014 |
| WO | 2015050060 A1 | 4/2015 |
| WO | 2015098770 A1 | 7/2015 |
| WO | 2015108646 A1 | 7/2015 |

OTHER PUBLICATIONS

Dec. 4, 2018, International Preliminary Report on Patentability issued in the International Patent Application No. PCT/JP2017/019438.
Shinzo Yamashita, General characteristics of Polybutadiene, the Journal of Japanese Society of Rubber, 1963, pp. 883(71) to 909(97), vol. 36, No. 10 with partial English translation.
Takashi Toyoizumi et al., Properties of Hydrogenated Polystyrene-block-poly (styrene-co-butadiene)-block-polystyrene (SSEBS) and its Miscibility in the Blends with Polypropylene, JSR Technical Review, 2008, pp. 1-6, No. 115, from URL: <http://www.jsr.co.jp/pdf/rd/tec115-1.pdf> with partial English translation.
Jul. 18, 2017, International Search Report issued in the International Patent Application No. PCT/JP2017/019438.
"TAFMER DF&A Meigara no Kihon Bussei", Dec. 8, 2015, particularly, col. of A-4085S.
May 16, 2019, the Supplementary European Search Report issued by the European Patent Office in the corresponding European Patent Application No. 17806502.5.

\* cited by examiner

RESIN COMPOSITION, METHOD OF PRODUCING RESIN COMPOSITION, AND SHAPED PRODUCT

TECHNICAL FIELD

The present disclosure relates to a resin composition, a method of producing a resin composition, and a shaped product.

BACKGROUND

Polyphenylene ethers (hereinafter, also referred to as "PPEs") are advantageous in terms of heat resistance, low specific gravity, flame retardance, and so forth, and are used in office automation (OA), automotive, and various other applications. However, one issue relating to polyphenylene ethers is that they have inadequate resistance to oils, fats, and organic solvents due to being amorphous resins, which, to a certain extent, limits applications and environments in which polyphenylene ethers can be used.

For this reason, alloying of PPE resins with crystalline resins is being attempted in some applications with the aim of improving chemical resistance. However, a dramatic deterioration in impact resistance that occurs in a temperature region from the glass transition temperature of the crystalline resin to lower temperatures has been problematic.

In response to this problem, the addition of thermoplastic elastomers having low glass transition temperatures has been investigated with the aim of increasing low-temperature impact resistance (for example, PTL 1), but, at present, it has not been possible to obtain a resin composition having tracking resistance in addition to low-temperature impact resistance and chemical resistance.

Moreover, it is necessary to add a comparatively large amount of thermoplastic elastomer in order to impart a certain degree of impact resistance. This reduces rigidity of the resultant composition and limits applications thereof, and thus expansion to use in mechanism components and structures is currently difficult (for example, PTL 2 to 4).

CITATION LIST

Patent Literature

PTL 1: WO 2015/50060 A1
PTL 2: JP 2004-161929 A
PTL 3: JP 5422561 B
PTL 4: JP 2007-519782 A

SUMMARY

Technical Problem

In view of the above, an objective of the present disclosure is to provide a resin composition and a shaped product that have excellent low-temperature impact resistance, chemical resistance, and tracking resistance, and have rigidity enabling adoption for mechanism components and structures.

Solution to Problem

As a result of diligent investigation to solve the problems set forth above, the inventors discovered that the problems can be advantageously solved by a resin composition that: contains a polyphenylene ether resin and also contains a combination of hydrogenated block copolymers, and/or modified products thereof, having specific structures and/or a specific olefinic polymer; does not substantially contain a polypropylene resin; has a continuous phase formed by the polyphenylene ether resin; and has a flexural modulus of at least a specific value as measured in accordance with ISO 178. In this manner, the inventors completed the present disclosure.

Primary features of the present disclosure are as follows.

[1] A resin composition comprising (a) a polyphenylene ether resin, and further comprising:

(b-1) a hydrogenated block copolymer, and/or modified product thereof, that is an at least partially hydrogenated product of a block copolymer including at least one polymer block A of mainly a vinyl aromatic compound and at least one polymer block B of mainly a conjugated diene compound and that has a peak molecular weight of 80,000 to 200,000 as measured as a standard polystyrene equivalent value by GPC, and (b-2) a hydrogenated block copolymer, and/or modified product thereof, that is an at least partially hydrogenated product of a block copolymer including at least one polymer block A of mainly a vinyl aromatic compound and at least one polymer block B of mainly a conjugated diene compound and that has a peak molecular weight of at least 10,000 and less than 80,000 as measured as a standard polystyrene equivalent value by GPC; and/or (c) an olefinic polymer formed from an olefin other than propylene, wherein the (a) component forms a continuous phase, the polymer block B in the (b-1) component and the polymer block B in the (b-2) component have a glass transition temperature of $-50°$ C. or lower, the (c) component has a brittleness temperature of $-50°$ C. or lower, the resin composition does not substantially contain (g) a polypropylene resin, and the resin composition has a flexural modulus of 1,600 MPa or more as measured in accordance with ISO 178.

[2] The resin composition according to the foregoing [1], wherein a ratio (b-1):(b-2) of the (b-1) component and the (b-2) component is 10:90 to 50:50.

[3] The resin composition according to the foregoing [1] or [2], further comprising (d) a compatibilizer.

[4] The resin composition according to any one of the foregoing [1] to [3], wherein the (b-1) component and/or the (b-2) component forms a worm-like domain.

[5] The resin composition according to any one of the foregoing [1] to [4], wherein the (c) component is dispersed in the resin composition with an average minor axis diameter of 2 μm or less and average major axis diameter/average minor axis diameter of 1 to 10.

[6] The resin composition according to any one of the foregoing [1] to [5], further comprising (e) a phosphate ester compound.

[7] The resin composition according to any one of the foregoing [1] to [6], further comprising (f) a phosphinate salt, wherein the (f) component includes at least one phosphinate salt selected from the group consisting of:

a phosphinate salt represented by general formula (1), shown below,

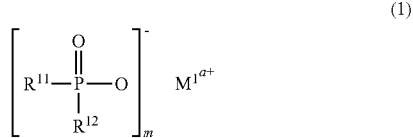

where $R^{11}$ and $R^{12}$ are each, independently of one another, a linear or branched alkyl group having a carbon number of 1 to 6 and/or an aryl group having a carbon number of 6 to 10, $M^1$ is at least one selected from the group consisting of a calcium ion, a magnesium ion, an aluminum ion, a zinc ion, a bismuth ion, a manganese ion, a sodium ion, a potassium ion, and a protonated nitrogenous base, a is an integer of 1 to 3, m is an integer of 1 to 3, and a=m; and a diphosphinate salt represented by formula (2), shown below,

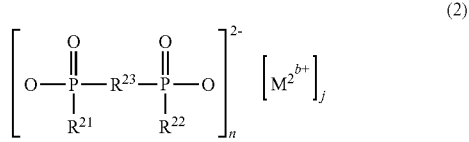

where $R^{21}$ and $R^{22}$ are each, independently of one another, a linear or branched alkyl group having a carbon number of 1 to 6 and/or an aryl group having a carbon number of 6 to 10, $R^{23}$ is a linear or branched alkylene group having a carbon number of 1 to 10, an arylene group having a carbon number of 6 to 10, an alkylarylene group having a carbon number of 6 to 10, or an arylalkylene group having a carbon number of 6 to 10, $M^2$ is at least one selected from the group consisting of a calcium ion, a magnesium ion, an aluminum ion, a zinc ion, a bismuth ion, a manganese ion, a sodium ion, a potassium ion, and a protonated nitrogenous base, b is an integer of 1 to 3, n is an integer of 1 to 3, j is an integer of 1 or 2, and b·j=2n.

[8] The resin composition according to any one of the foregoing [1] to [7], wherein
the (c) component is an ethylene-1-butene copolymer.

[9] The resin composition according to any one of the foregoing [1] to [8], wherein
the (c) component has a density of 0.87 g/cm³ or more.

[10] The resin composition according to any one of the foregoing [1] to [9], wherein
the (c) component has a density of 0.90 g/cm³ or more.

[11] The resin composition according to any one of the foregoing [1] to [10], wherein
the (d) component is a hydrogenated block copolymer, and/or modified product thereof, that is an at least partially hydrogenated product of a block copolymer including at least one polymer block I of mainly a vinyl aromatic compound and at least one polymer block II of mainly a conjugated diene compound,
total content of 1,2-vinyl bonds and 3,4-vinyl bonds relative to double bonds in conjugated diene compound units included in the (d) component is more than 50% and not more than 90%,
the (d) component has a vinyl aromatic compound unit content of 30 mass % to 50 mass %,
the polymer block II in the (d) component has a glass transition temperature of higher than −50° C., and
percentage hydrogenation of double bonds in conjugated diene compound units included in the (d) component is 80% to 100%.

[12] A method of producing the resin composition according to any one of the foregoing [1] to [11], comprising:
a step (1-1) of melt-kneading the (a) component and also the (d) component as necessary to obtain a kneaded product; and
a step (1-2) of adding the (b-1) and (b-2) components and/or the (c) component to the kneaded product obtained in step (1-1) and performing melt-kneading thereof.

[13] A shaped product comprising the resin composition according to any one of the foregoing [1] to [11].

Advantageous Effect

According to the present disclosure, it is possible to obtain a resin composition and a shaped product that have excellent low-temperature impact resistance, chemical resistance, and tracking resistance, and have rigidity enabling adoption for mechanism components and structures.

BRIEF DESCRIPTION OF THE DRAWINGS

In the accompanying drawings.

DETAILED DESCRIPTION

Figure 1:
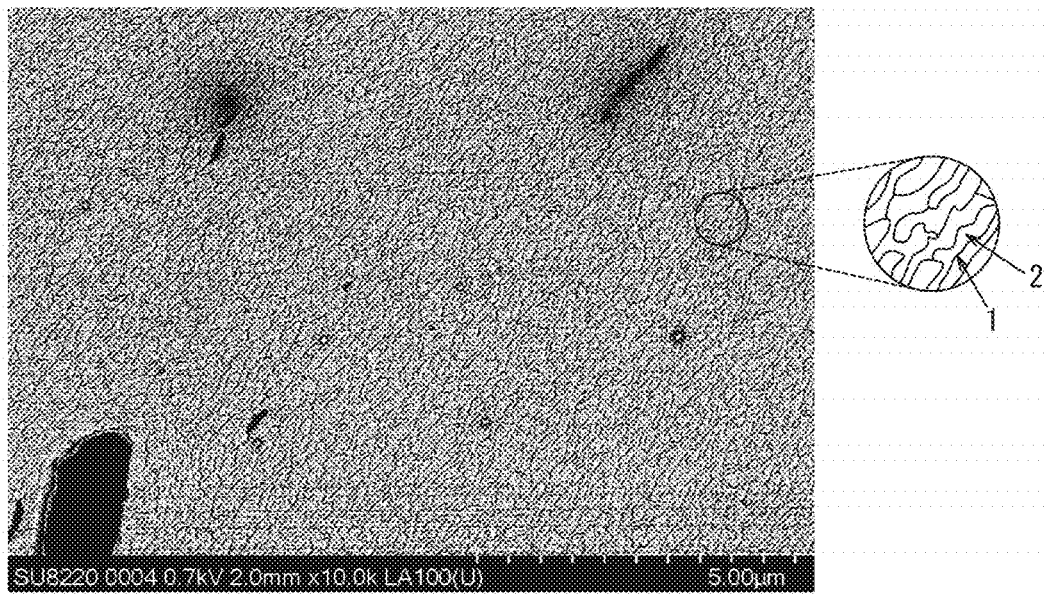
FIG. 1 is an image of a resin composition of Example 1 in which a (b-1) component and a (b-2) component form worm-like domains, as observed using a TEM.

The following provides a detailed description of an embodiment of the present disclosure (hereinafter, also referred to as the "present embodiment"). However, the present disclosure is not limited to the following embodiment and may be implemented with various alterations that are within the essential scope thereof.

[Resin Composition]
A resin composition of the present embodiment contains (a) a polyphenylene ether resin, and further contains:
(b-1) a hydrogenated block copolymer, and/or modified product thereof, that is an at least partially hydrogenated product of a block copolymer including at least one polymer block A of mainly a vinyl aromatic compound and at least one polymer block B of mainly a conjugated diene compound and that has a peak molecular weight of 80,000 to 200,000 as measured as a standard polystyrene equivalent value by GPC, and (b-2) a hydrogenated block copolymer, and/or modified product thereof, that is an at least partially hydrogenated product of a block copolymer including at least one polymer block A of mainly a vinyl aromatic compound and at least one polymer block B of mainly a conjugated diene compound and that has a peak molecular weight of at least 10,000 and less than 80,000 as measured as a standard polystyrene equivalent value by GPC; and/or
(c) an olefinic polymer formed from an olefin other than propylene, wherein
the (a) component forms a continuous phase,
the polymer block B in the (b-1) component and the polymer block B in the (b-2) component have a glass transition temperature of −50° C. or lower,
the (c) component has a brittleness temperature of −50° C. or lower, the resin composition does not substantially contain (g) a polypropylene resin, and the resin composition has a flexural modulus of 1,600 MPa or more as measured in accordance with ISO 178.

In other words, the resin composition of the present embodiment contains at least a combination of the (a) component, the (b-1) component, and the (b-2) component; a combination of the (a) component and the (c) component; or a combination of the (a) component, the (b-1) component, the (b-2) component, and the (c) component.

Note that in the present specification, a hydrogenated block copolymer, and/or modified product thereof, that is an at least partially hydrogenated product of a block copolymer including at least one polymer block of mainly a vinyl aromatic compound and at least one polymer block of mainly a conjugated diene compound may also be referred to as simply as a "hydrogenated block copolymer". Moreover, among hydrogenated block copolymers, a hydrogenated block copolymer that is not modified may also be referred to as an "unmodified hydrogenated block copolymer" and a modified product of a hydrogenated block copolymer may also be referred to as a "modified hydrogenated block copolymer".

Furthermore, 1,2-vinyl bonds and 3,4-vinyl bonds in conjugated diene compound units may also be referred to as "all vinyl bonds".

The following describes components of the resin composition of the present embodiment.

The resin composition of the present embodiment has excellent low-temperature impact resistance, chemical resistance, and tracking resistance, and has rigidity enabling adoption for mechanism components and structures. The resin composition preferably also has excellent flame retardance. Note that the phrase "excellent flame retardance" as used in the present embodiment refers to a flame retardance level of V-1 or higher in a UL94 vertical burning test described in the subsequent EXAMPLES section.

((a) Polyphenylene Ether Resin)

The (a) polyphenylene ether resin used in the present embodiment may be, but is not specifically limited to, a polyphenylene ether, a modified polyphenylene ether, or a mixture of both. One type of (a) component may be used individually, or two or more types of (a) components may be used in combination.

From a viewpoint of further improving flame retardance of the resin composition, the reduced viscosity of the (a) component is preferably 0.25 dL/g or more, and more preferably 0.28 dL/g or more, and is preferably 0.60 dL/g or less, more preferably 0.57 dL/g or less, and particularly preferably 0.55 dL/g or less. The reduced viscosity can be controlled through the polymerization time and the amount of catalyst.

Note that the reduced viscosity can be measured as $\eta_{sp}/c$ of a 0.5 g/dL chloroform solution at a temperature of 30° C. using an Ubbelohde viscometer.

Polyphenylene Ether

The polyphenylene ether may be, but is not specifically limited to, a homopolymer formed from a repeating unit structure represented by the following formula (3) and/or a copolymer including a repeating unit structure represented by the following formula (3).

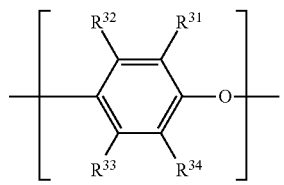

[In formula (3), $R^{31}$, $R^{32}$, $R^{33}$, and $R^{34}$ are each, independently of one another, a monovalent group selected from the group consisting of a hydrogen atom, a halogen atom, a primary alkyl group having a carbon number of 1 to 7, a secondary alkyl group having a carbon number of 1 to 7, a phenyl group, a haloalkyl group, an aminoalkyl group, a hydrocarbon oxy group, and a halohydrocarbon oxy group in which a halogen atom and an oxygen atom are separated by at least two carbon atoms.

Commonly known examples can be used as such polyphenylene ethers without any specific limitations. Specific examples of polyphenylene ethers that can be used include homopolymers such as poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether); and copolymers such as copolymerized products of 2,6-dimethylphenol with another phenol such as 2,3,6-trimethylphenol or 2-methyl-6-butylphenol. Poly(2,6-dimethyl-1,4-phenylene ether) and a copolymer of 2,6-dimethylphenol and 2,3,6-trimethylphenol are preferable, and poly(2,6-dimethyl-1,4-phenylene ether) is more preferable.

The method by which the polyphenylene ether is produced is not specifically limited and may be a conventional and commonly known method. Specific examples of polyphenylene ether production methods that can be used include a method described in U.S. Pat. No. 3,306,874 A in which a polyphenylene ether is produced through oxidative polymerization of 2,6-xylenol, for example, using a complex of a cuprous salt and an amine as a catalyst, and methods described in U.S. Pat. Nos. 3,306,875 A, 3,257,357 A, 3,257,358 A, JP S52-17880 B, JP S50-51197 A, and JP S63-152628 A.

Modified Polyphenylene Ether

The modified polyphenylene ether may be, but is not specifically limited to, a modified polyphenylene ether obtained through grafting and/or addition of a styrenic polymer and/or derivative thereof to the polyphenylene ether described above. The percentage increase in mass due to grafting and/or addition is not specifically limited, but relative to 100 mass % of the modified polyphenylene ether, is preferably 0.01 mass % or more, and is preferably 10 mass % or less, more preferably 7 mass % or less, and particularly preferably 5 mass % or less.

The method by which the modified polyphenylene ether is produced is not specifically limited and may, for example, be a method in which the polyphenylene ether described above and a styrenic polymer and/or derivative thereof are caused to react in a molten state, solution state, or slurry state at 80° C. to 350° C. in the presence or absence of a radical precursor.

In a case in which the (a) component is a mixture of a polyphenylene ether and a modified polyphenylene ether, the mixing ratio of the polyphenylene ether and the modified polyphenylene ether may be any ratio without any specific limitations.

((b-1), (b-2) Hydrogenated Block Copolymers)

Hydrogenated block copolymers serving as the (b-1) component and the (b-2) component are each a hydrogenated block copolymer that is an at least partially hydrogenated product of a block copolymer including at least one polymer block A of mainly a vinyl aromatic compound and at least one polymer block B of mainly a conjugated diene compound, and/or a modified product of the hydrogenated block copolymer. The peak molecular weight as measured as a standard polystyrene equivalent value by GPC is 80,000 to 200,000 in the case of the (b-1) component and is at least 10,000 and less than 80,000 in the case of the (b-2) component.

Low-temperature impact resistance of the composition is improved as a result of the peak molecular weights of the (b-1) and (b-2) components satisfying these conditions.

Polymer Block A

The polymer block A of mainly a vinyl aromatic compound may, for example, be a homopolymer block of a vinyl aromatic compound or a copolymer block of a vinyl aromatic compound and a conjugated diene compound. In particular, a homopolymer block of a vinyl aromatic compound, a copolymer block of a vinyl aromatic compound and a conjugated diene compound in which the content of vinyl aromatic compound units is more than 50 mass % (preferably 70 mass % or more), or the like is preferable.

Note that the phrase "mainly of a vinyl aromatic compound" in relation to the polymer block A means that the content of vinyl aromatic compound units in the polymer block A prior to hydrogenation is more than 50 mass %. The content of vinyl aromatic compound units is preferably 70 mass % or more.

Examples of vinyl aromatic compounds that may be used include, but are not specifically limited to, styrene, α-methylstyrene, vinyltoluene, p-tert-butylstyrene, and diphenylethylene. Of these vinyl aromatic compounds, styrene is preferable.

Examples of conjugated diene compounds that may be used include the subsequently described conjugated diene compounds. It is preferable that butadiene, isoprene, or a combination thereof is used.

One of these compounds may be used individually, or two or more of these compounds may be used in combination.

The distribution of vinyl aromatic compound, conjugated diene compound, and the like in the molecular chain of the polymer block in the polymer block A may be a random distribution, a tapered distribution (i.e., a distribution in which a monomer component increases or decreases along the molecular chain), a partial block-shaped distribution, or any combination of these distributions.

In a case in which two or more polymer blocks A are present in the (b-1) component and/or the (b-2) component, these polymer blocks A may each have the same structure, or may have different structures. Moreover, the polymer block(s) A in the (b-1) component and the polymer block(s) A in the (b-2) component may be the same or different.

The number average molecular weight (Mn) of the polymer block(s) A is preferably 5,000 to 25,000, and more preferably 10,000 to 25,000 from a viewpoint of obtaining even better rigidity, chemical resistance, low-temperature impact resistance, and tracking resistance.

Polymer Block B

The polymer block B of mainly a conjugated diene compound may, for example, be a homopolymer block of a conjugated diene compound or a random copolymer block of a conjugated diene compound and a vinyl aromatic compound. In particular, a homopolymer block of a conjugated diene compound, a copolymer block of a conjugated diene compound and a vinyl aromatic compound in which the content of conjugated diene compound units is more than 50 mass % (preferably 70 mass % or more), or the like is preferable.

Note that the phrase "mainly of a conjugated diene compound" in relation to the polymer block B means that the content of conjugated diene compound units in the polymer block B is more than 50 mass %. The content of conjugated diene compound units is preferably 70 mass % or more.

Examples of conjugated diene compounds that may be used include, but are not specifically limited to, butadiene, isoprene, 1,3-pentadiene, and 2,3-dimethyl-1,3-butadiene. Of these conjugated diene compounds, butadiene, isoprene, and combinations thereof are preferable.

Examples of vinyl aromatic compounds that may be used include the previously described vinyl aromatic compounds. It is preferable that styrene is used as a vinyl aromatic compound.

One of these compounds may be used individually, or two or more of these compounds may be used in combination.

The distribution of conjugated diene compound, vinyl aromatic compound, and the like in the molecular chain of the polymer block in the polymer block B may be a random distribution, a tapered distribution (i.e., a distribution in which a monomer component increases or decreases along the molecular chain), a partial block-shaped distribution, or any combination of these distributions.

In a case in which two or more polymer blocks B are present in the (b-1) component and/or the (b-2) component, these polymer blocks B may each have the same structure, or may have different structures. Moreover, the polymer block(s) B in the (b-1) component and the polymer block(s) B in the (b-2) component may be the same or different.

The percentage hydrogenation of ethylenic double bonds in conjugated diene compound units of the polymer block(s) B is preferably at least 20% and less than 80%, and more preferably at least 20% and less than 70% from a viewpoint of obtaining even better rigidity, chemical resistance, low-temperature impact resistance, and tracking resistance. A percentage hydrogenation within any of the ranges set forth above is preferable because this enhances impact resistance of the resin composition.

The total content of 1,2-vinyl bonds and 3,4-vinyl bonds as a proportion relative to ethylenic double bonds in conjugated diene compound units of the polymer block(s) B is preferably at least 25% and less than 60%, more preferably 25% to 55%, and even more preferably 25% to 50% from a viewpoint of obtaining even better rigidity, chemical resistance, low-temperature impact resistance, and tracking resistance.

The total content of 1,2-vinyl bonds and 3,4-bonds (content of all vinyl bonds) referred to in the present specification is the total content of 1,2-vinyl bonds and 3,4-vinyl bonds as a proportion relative to the total content of 1,2-vinyl bonds, 3,4-vinyl bonds, and 1,4-conjugated bonds in conjugated diene compound units of a conjugated diene compound-containing polymer block prior to hydrogenation. The content of all vinyl bonds can be determined through measurement using an infrared spectrophotometer and calculation in accordance with the method described in Analytical Chemistry, Volume 21, No. 8, August 1949.

The number average molecular weight (Mn) of the polymer block(s) B is preferably 20,000 to 100,000, and more preferably 20,000 to 80,000 from a viewpoint of obtaining even better rigidity, chemical resistance, low-temperature impact resistance, and tracking resistance.

The post-hydrogenation glass transition temperature of the polymer block(s) B is −50° C. or lower, and is preferably −60° C. or lower, and more preferably −70° C. or lower from a viewpoint of obtaining even better rigidity, chemical resistance, low-temperature impact resistance, and tracking resistance.

The glass transition temperature of a block copolymer and the glass transition temperature of a polymer block in a block copolymer referred to in the present specification can be measured, for example, by using a dynamic viscoelasticity measurement apparatus to measure a sample in the form of a film under a nitrogen atmosphere in tensile mode with a temperature scan rate of 3° C./min and a frequency of 1 Hz.

The polymer block B may, for example, be a single polymer block in which the total content of 1,2-vinyl bonds and 3,4-vinyl bonds as a proportion relative to ethylenic double bonds in conjugated diene compound units included in the polymer block B is at least 25% and less than 60%, or may be a polymer block of mainly a conjugated diene compound that includes both a polymer block B1 of mainly a conjugated diene compound in which the total content of 1,2-vinyl bonds and 3,4-vinyl bonds as a proportion relative to ethylenic double bonds is 25% to 45% and a polymer block B2 of mainly a conjugated diene compound in which the total content of 1,2-vinyl bonds and 3,4-vinyl bonds as a proportion relative to ethylenic double bonds is at least 45% and less than 70%.

The structure of the block copolymer including the polymer block B1 and the polymer block B2 may, for example, be represented by A-B2-B1-A, A-B2-B1, or the like, where "A" indicates the polymer block A, "B1" indicates the polymer block B1, and "B2" indicates the polymer block B2. Moreover, the block copolymer including the polymer block B1 and the polymer block B2 can be obtained, for example, by a commonly known polymerization method in which the content of all vinyl bonds is controlled based on an adjusted feed sequence of each monomer unit.

Hydrogenated Block Copolymer Structure

The hydrogenated block copolymer structure in the (b-1) component and the (b-2) component may, for example, be an A-B structure, A-B-A structure, B-A-B-A structure, (A-B-)n-X structure (n is an integer of 1 or more and X is a reaction residue of a polyfunctional coupling agent such as silicon tetrachloride or tin tetrachloride, or a residue of an initiator such as a polyfunctional organolithium compound), A-B-A-B-A structure, or the like, where "A" indicates the polymer block A, and "B" indicates the polymer block B.

Moreover, in regard to block structure, the polymer block B is preferably a homopolymer block of a conjugated diene compound or a copolymer block of a conjugated diene compound and a vinyl aromatic compound in which the content of conjugated diene compound units is more than 50 mass % (preferably 70 mass % or more), and the polymer block A is preferably a homopolymer block of a vinyl aromatic compound or a copolymer block of a vinyl aromatic compound and a conjugated diene compound in which the content of the vinyl aromatic compound is more than 50 mass % (preferably 70 mass % or more).

The (b-1) component and/or the (b-2) component may further include blocks other than the polymer block A and the polymer block B.

The molecular structure of the hydrogenated block copolymer in each of the (b-1) and (b-2) components is not specifically limited and may, for example, be a linear structure, a branched structure, a radial structure, or any combination thereof.

Vinyl Aromatic Compound Unit Content

The content of vinyl aromatic compound units (i.e., hydrogenated block copolymer constitutional units derived from a vinyl aromatic compound) in the (b-1) component and the (b-2) component is not specifically limited, but from a viewpoint of heat resistance and mechanical strength of the composition, is preferably 10 mass % to 70 mass %, more preferably 20 mass % to 70 mass %, even more preferably 20 mass % to 60 mass %, further preferably 30 mass % to 50 mass %, and particularly preferably 30 mass % to 40 mass %. Moreover, there is no limitation to use of just one type of (b-1) component and/or (b-2) component having a vinyl aromatic compound unit content within any of the ranges set forth above, and two or more types of (b-1) components and/or (b-2) components with differing vinyl aromatic compound unit contents may be used in combination.

Content of all Vinyl Bonds

In the (b-1) component and the (b-2) component, the total content of 1,2-vinyl bonds and 3,4-vinyl bonds as a proportion relative to ethylenic double bonds in conjugated diene compound units is preferably at least 25% and less than 60%, more preferably at least 25% and not more than 55%, and even more preferably at least 25% and not more than 50%.

Impact resistance of the resin composition at low temperatures is enhanced when the total content of 1,2-vinyl bonds and 3,4-vinyl bonds as a proportion of ethylenic double bonds is less than 60%. Impact resistance at low temperatures is further enhanced when this proportion is 50% or less. Moreover, it is preferable that the total content of 1,2-vinyl bonds and 3,4-vinyl bonds as a proportion of ethylenic double bonds is 25% or more from a viewpoint of improving (d) component compatibility.

The method by which the total content of 1,2-vinyl bonds and 3,4-vinyl bonds as a proportion of ethylenic double bonds is controlled to within any of the ranges set forth above is not specifically limited and may, for example, be a method in which a modifier for the content of 1,2-vinyl bonds is added or a method in which the polymerization temperature is adjusted in production of the (b-1) component and/or the (b-2) component.

Note that "total content of 1,2-vinyl bonds and 3,4-vinyl bonds relative to double bonds in conjugated diene compound units" refers to the total content of 1,2-vinyl bonds and 3,4-vinyl bonds relative to double bonds (ethylenic double bonds) in conjugated diene compound units in the pre-hydrogenation block copolymer of a hydrogenated block copolymer. For example, the pre-hydrogenation block copolymer may be measured using an infrared spectrophotometer and calculation may be performed by the Hampton method. Calculation can also be performed from the post-hydrogenation block copolymer using NMR.

Percentage Hydrogenation

The percentage hydrogenation of ethylenic double bonds (double bonds in conjugated diene compound units) in the block copolymer of each of the (b-1) and (b-2) components is preferably more than 0% and less than 80%, more preferably at least 10% and less than 80%, even more preferably at least 20% and less than 80%, further preferably 20% to 70%, and particularly preferably at least 20% and less than 70%. A percentage hydrogenation within any of the ranges set forth above is preferable because impact resistance of the resin composition is enhanced.

A (b-1) component and a (b-2) component having a percentage hydrogenation such as set forth above can be easily obtained by, for example, controlling the amount of hydrogen that is consumed in a hydrogenation reaction of ethylenic double bonds in the block copolymer such that the percentage hydrogenation is within a desired range (for example, at least 10% and less than 80%).

The percentage hydrogenation can be determined by, for example, quantifying double bonds remaining in the polymer block(s) B by NMR measurement.

For the (b-1) and (b-2) components, a case in which the total content of 1,2-vinyl bonds and 3,4-vinyl bonds as a proportion relative to ethylenic double bonds in conjugated diene compound units included in the (b-1) or (b-2) component is less than 60% and/or the percentage hydrogenation of ethylenic double bonds in the (b) component is less than 80% is more preferable because impact resistance of the resin composition at low temperatures is enhanced.

Peak Molecular Weight

The post-hydrogenation peak molecular weight of the (b-1) component as measured as a standard polystyrene equivalent value by GPC is 80,000 to 200,000, and preferably 100,000 to 200,000 from a viewpoint of low-temperature impact resistance, chemical resistance, tracking resistance, and rigidity. Moreover, the post-hydrogenation peak molecular weight of the (b-2) component as measured as a standard polystyrene equivalent value by GPC is at least 10,000 and less than 80,000, and preferably at least 30,000 and less than 80,000 from a viewpoint of low-temperature impact resistance, chemical resistance, tracking resistance, and rigidity.

The method by which the peak molecular weights of the (b-1) and (b-2) components are controlled to within any of the ranges set forth above is not specifically limited and may, for example, be a method of adjusting the amount of catalyst in a polymerization step.

Note that the peak molecular weight referred to in the present specification can be measured under the following conditions using a Gel Permeation Chromatography System 21 produced by Showa Denko K.K. In this measurement, a column obtained by connecting one K-G, one K-800RL, and one K-800R (produced by Showa Denko K.K.) in this order is used as a column, the column temperature is set as 40° C., chloroform is used as a solvent, the solvent flow rate is set as 10 mL/min, and the sample concentration is set as 1 g of hydrogenated block copolymer per 1 L of chloroform solution. A calibration curve is prepared using standard polystyrene having molecular weights of 3,650,000, 2,170,000, 1,090,000, 681,000, 204,000, 52,000, 30,200, 13,800, 3,360, 1,300, and 550. Measurement is performed with the UV (ultraviolet) wavelength of the detector set as 254 nm for both the standard polystyrene and the hydrogenated block copolymer.

In a case in which the (b-1) component has an A-B-A structure, for example, the number average molecular weight (MnbA) of polymer blocks A in the (b-1) component can be calculated from an equation: (MnbA)=(Mnb)×proportion of bound vinyl aromatic compound÷2, based on the number average molecular weight (Mnb) of the (b-1) component by presuming that the molecular weight distribution of the (b-1) component is 1 and that the two polymer blocks A of mainly a vinyl aromatic compound are present with the same molecular weight. Note that in a situation in which the sequence of block structure A and block structure B is clear at the stage of synthesis of the vinyl aromatic compound-conjugated diene compound block copolymer, calculation can be performed from the proportion of the block structure A based on the measured number average molecular weight (Mnb) of the (b-1) component without relying on the preceding equation.

The pre-hydrogenation molecular weight distribution (Mw/Mn) of each of the (b-1) and (b-2) components is preferably 1.01 to 1.50, and more preferably 1.03 to 1.40 from a viewpoint of obtaining even better rigidity, chemical resistance, low-temperature impact resistance, and tracking resistance.

Production Method

The method by which the hydrogenated block copolymer of each of the (b-1) and (b-2) components is produced is not specifically limited and may be a commonly known method. Specific examples of commonly known production methods that can be used include those described in JP S47-11486 A, JP S49-66743 A, JP S50-75651 A, JP S54-126255 A, JP S56-10542 A, JP S56-62847 A, JP S56-100840 A, JP H02-300218 A, GB 1130770 A, U.S. Pat. Nos. 3,281,383 A, 3,639,517 A, GB 1020720 A, U.S. Pat. Nos. 3,333,024 A, and 4,501,857 A.

Modified Hydrogenated Block Copolymer

A modified product of a hydrogenated block copolymer that may be included in the (b-1) component or the (b-2) component is, for example, a modified hydrogenated block copolymer obtained by reacting the hydrogenated block copolymer set forth above (in particular, an unmodified hydrogenated block copolymer) and an $\alpha,\beta$-unsaturated carboxylic acid or derivative thereof (ester compound or acid anhydride compound) in a molten state, solution state, or slurry state at 80° C. to 350° C. in the presence or absence of a radical precursor. In such a situation, the $\alpha,\beta$-unsaturated carboxylic acid or derivative thereof is preferably grafted or added in a proportion of 0.01 mass % to 10 mass % relative to the unmodified hydrogenated block copolymer.

In a case in which an unmodified hydrogenated block copolymer and a modified hydrogenated block copolymer are used in combination as the (b-1) component or the (b-2) component, no specific limitations are placed on the mixing ratio of the unmodified hydrogenated block copolymer and the modified hydrogenated block copolymer.

Ratio of (b-1) Component and (b-2) Component

The ratio (b-1):(b-2) of the (b-1) component having a peak molecular weight of 80,000 to 200,000 as measured as a standard polystyrene equivalent value by GPC and the (b-2) component having a peak molecular weight of at least 10,000 and less than 80,000 as measured as a standard polystyrene equivalent value by GPC is preferably 10:90 to 50:50, and more preferably 20:80 to 40:60 from a viewpoint of obtaining even better rigidity, chemical resistance, low-temperature impact resistance, and tracking resistance.

The ratio of the (b-1) component and the (b-2) component can be determined by, for example, calculating the area ratio of peaks for the (b-1) and (b-2) components in GPC measurement performed in the same manner as measurement of the peak molecular weight described above.

The method by which the ratio of the (b-1) component and the (b-2) component is controlled to within any of the ranges set forth above is not specifically limited and may, for example, be a method of adjusting the amount of coupling agent used in post-polymerization coupling treatment.

((c) Olefinic Polymer)

The (c) component is not specifically limited and may, for example, be a homopolymer of an olefinic monomer other than propylene or a copolymer of two or more monomers including an olefinic monomer other than propylene. Of such polymers, a copolymer of ethylene and an $\alpha$-olefin other than ethylene is preferable from a viewpoint of low-temperature impact resistance. Moreover, propylene units are not included as constituent monomer units of the (c) component from a viewpoint of low-temperature impact resistance, chemical resistance, tracking resistance, and rigidity of the obtained resin composition.

Note that the phrases "olefinic polymer formed from an olefin other than propylene" and "propylene units are not included" are inclusive of cases in which propylene is included as a constitutional unit to an extent that does not impair the effects of the present disclosure and indicate that the content of propylene units among all constitutional units in the (c) component is less than 0.1 mass %, for example.

The (c) component may, for example, be a copolymer of ethylene and one or more C4 to C20 α-olefins. Of such copolymers, a copolymer of ethylene and one or more C4 to C8 α-olefins is more preferable, a copolymer of ethylene and one or more comonomers selected from the group consisting of 1-butene, 1-hexene, 4-methyl-1-pentene, and 1-octene is even more preferable, and a copolymer of ethylene and 1-butene is particularly preferable. The use of such a copolymer as the (c) component tends to yield a resin composition having higher impact resistance and higher chemical resistance.

One type of (c) component may be used individually, or two or more types of (c) components may be used in combination. Moreover, two or more types of ethylene-α-olefin copolymers may be used as the (c) component.

The ethylene content in the (c) component relative to the total amount of olefinic polymer is preferably 5 mass % to 95 mass %, and more preferably 30 mass % to 90 mass % from a viewpoint of low-temperature curing resistance and flexibility of the resin composition.

Although no specific limitations are placed on the content of α-olefins other than ethylene in the (c) component, the content thereof relative to the total amount of olefinic polymer is preferably 5 mass % or more, and more preferably 20 mass % or more from a viewpoint of low-temperature curing resistance and flexibility of the resin composition, and is preferably 50 mass % or less, and more preferably 48 mass % or less from a viewpoint of rigidity of the resin composition.

The brittleness temperature of the (c) component is −50° C. or lower, and, from a viewpoint of obtaining even better impact resistance and chemical resistance, is preferably −60° C. or lower, and more preferably −70° C. or lower.

The brittleness temperature can be measured in accordance with ASTM D746.

The density of the (c) component as measured in accordance with JIS K7112 (density at raw material stage prior to kneading) is preferably 0.87 g/cm$^3$ or more, and more preferably 0.90 g/cm$^3$ or more from a viewpoint of chemical resistance of the resin composition.

The method by which the density of the (c) component is controlled to within any of the ranges set forth above is not specifically limited and may, for example, be a method of adjustment through control of the percentage content of ethylene units.

The melt flow rate (MFR) of the (c) component (measured in accordance with ASTM D-1238 at 190° C. with a load of 2.16 kgf; density at raw material stage prior to kneading) is preferably 0.1 g/10 min to 5.0 g/10 min, and more preferably 0.3 g/10 min to 4.0 g/10 min from a viewpoint of stabilizing morphology through dispersion of the (c) component in the resin composition and from a viewpoint of impact resistance of the resin composition.

The method by which the melt flow rate of the (c) component is controlled to within any of the ranges set forth above is not specifically limited and may, for example, be a method of adjusting the polymerization temperature and polymerization pressure in production of the (c) component or a method of adjusting the molar ratio of the concentration of monomers such as ethylene and α-olefins and the concentration of hydrogen in the polymerization system.

The (c) component may be an olefinic polymer rubber formed from an olefin other than propylene, for example.

The torsional rigidity of the (c) component is preferably 1 MPa to 30 MPa, and more preferably 1 MPa to 25 MPa from a viewpoint of providing the composition with sufficient impact resistance. The torsional rigidity of the (c) component can be measured in accordance with ASTM D 1043.

The Shore A hardness of the (c) component is preferably 40 to 110, and more preferably 50 to 100 from a viewpoint of providing the composition with sufficient impact resistance. The Shore A hardness of the (c) component can be measured in accordance with JIS K 6253.

The method by which the (c) component is produced is not specifically limited and may, for example, be a method using a catalyst (for example, a catalyst based on titanium, a metallocene, or vanadium) with which it is easy to obtain an α-olefin polymer polymerized to high molecular weight under typical processing conditions. In particular, a method using a metallocene catalyst or a titanium chloride catalyst is preferable from a viewpoint of stability of structure control. A commonly known method such as described in JP H06-306121 A or JP H07-500622 A may be used as a method for ethylene-α-olefin copolymer production.

((d) Compatibilizer)

Although no specific limitations are placed on (d) a compatibilizer that may be used in the present embodiment as necessary, the (d) component is preferably a copolymer including a chain segment having high compatibility with the (a) component and a chain segment having high compatibility with the (b-1) and (b-2) components and/or the (c) component. The chain segment having high compatibility with the (a) component may, for example, be a polystyrene chain or a polyphenylene ether chain. The chain segment having high compatibility with the (b-1) and (b-2) components and/or the (c) component may, for example, be a polyolefin chain or a copolymer elastomer molecular chain of ethylene and an α-olefin.

Specifically examples of such copolymers that are preferable include a copolymer having a polystyrene chain-polyolefin chain, a copolymer having a polyphenylene ether chain-polyolefin chain, and hydrogenated block copolymers thereof. Of these copolymers, a hydrogenated block copolymer is preferable from a viewpoint of thermal stability. One of these copolymers may be used individually, or two or more of these copolymers may be used in combination.

One example of a hydrogenated block copolymer that may be used as the (d) component is a hydrogenated block copolymer that is an at least partially hydrogenated product of a block copolymer including at least one polymer block I of mainly a vinyl aromatic compound and at least one polymer block II of mainly a conjugated diene compound. In particular, an at least partially hydrogenated product of a block copolymer composed of a polymer block I of mainly a vinyl aromatic compound and a polymer block II of mainly a conjugated diene compound is preferable as a hydrogenated block copolymer used as the (d) component.

Note that the hydrogenated block copolymer used as the (d) component is not considered to include the previously described (b) component.

The following describes matter relating to unmodified and modified hydrogenated block copolymers that may be used as the (d) component.

Polymer Block I of Mainly Vinyl Aromatic Compound

The polymer block I of mainly a vinyl aromatic compound may be, but is not specifically limited to, a homopolymer block of a vinyl aromatic compound or a copolymer block of a vinyl aromatic compound and a conjugated diene compound.

The phrase "of mainly a vinyl aromatic compound" in relation to the polymer block I means that the content of vinyl aromatic compound units in the polymer block I prior to hydrogenation is more than 50 mass %. The content of vinyl aromatic compound units is preferably 70 mass % or more, and more preferably 80 mass % or more, and may be 100 mass % or less.

Examples of vinyl aromatic compounds that may be constituents of the polymer block I include, but are not specifically limited to, styrene, α-methylstyrene, vinyltoluene, p-tert-butylstyrene, and diphenylethylene, with styrene being preferable.

Examples of conjugated diene compounds that may be constituents of the polymer block I include butadiene, isoprene, 1,3-pentadiene, and 2,3-dimethyl-1,3-butadiene. Butadiene, isoprene, and combinations thereof are preferable, and butadiene is more preferable.

One of these compounds may be used individually, or two or more of these compounds may be used in combination.

From a viewpoint of improving dispersibility in the resin composition, the number average molecular weight (Mn) of the polymer block I is preferably 15,000 or more, more preferably 20,000 or more, even more preferably 25,000 or more, and particularly preferably 26,000 or more, and is preferably 100,000 or less.

Polymer Block II of Mainly Conjugated Diene Compound

The polymer block II of mainly a conjugated diene compound may be, but is not specifically limited to, a homopolymer block of a conjugated diene compound or a copolymer block of a conjugated diene compound and a vinyl aromatic compound.

The phrase "of mainly a conjugated diene compound" in relation to the polymer block II means that the content of conjugated diene compound units in the polymer block II prior to hydrogenation is more than 50 mass %. The content of conjugated diene compound units is preferably 70 mass % or more, and more preferably 80 mass % or more from a viewpoint of increasing fluidity of the resin composition, and may be 100 mass % or less.

Examples of conjugated diene compounds that may be constituents of the polymer block II include, but are not specifically limited to, butadiene, isoprene, 1,3-pentadiene, and 2,3-dimethyl-1,3-butadiene. Butadiene, isoprene, and combinations thereof are preferable, and butadiene is more preferable.

Examples of vinyl aromatic compounds that may be constituents of the polymer block II include, but are not specifically limited to, styrene, α-methylstyrene, vinyltoluene, p-tert-butylstyrene, and diphenylethylene, with styrene being preferable.

One of these compounds may be used individually, or two or more of these compounds may be used in combination.

The percentage hydrogenation of ethylenic double bonds in conjugated diene compound units included in the polymer block II is preferably 80% or more, and more preferably 90% or more from a viewpoint of obtaining even better rigidity, chemical resistance, low-temperature impact resistance, and tracking resistance.

The percentage hydrogenation can be measured using a nuclear magnetic resonance (NMR) spectrometer.

In the microstructure of the polymer block II (bonding mode of conjugated diene compound), the total content of 1,2-vinyl bonds and 3,4-vinyl bonds (content of all vinyl bonds) relative to ethylenic double bonds in conjugated diene compound units included in the polymer block II is preferably 50% or more, more preferably 55% or more, and even more preferably 65% or more, and is preferably 90% or less from a viewpoint of increasing compatibility of the polymer block II with the (b) component and improving low-temperature impact resistance.

The number average molecular weight (Mn) of the polymer block II is preferably 30,000 to 100,000, and more preferably 40,000 to 100,000 from a viewpoint of obtaining even better rigidity, chemical resistance, low-temperature impact resistance, and tracking resistance.

The post-hydrogenation glass transition temperature of the polymer block II is preferably higher than −50° C., more preferably higher than −50° C. and not higher than 0° C., and even more preferably −40° C. to −10° C. from a viewpoint of obtaining even better rigidity, chemical resistance, low-temperature impact resistance, and tracking resistance.

The distribution of vinyl aromatic compound in the molecular chain of the polymer block I and the distribution of conjugated diene compound in the molecular chain of the polymer block II included in a block copolymer used as the (d) component are not specifically limited and may, for example, be a random distribution, a tapered distribution (i.e., a distribution in which a monomer component increases or decreases along the molecular chain), a partial block-shaped distribution, or a combination of these distributions The block structure of a block copolymer in an unmodified or modified hydrogenated block copolymer used as the (d) component is not specifically limited. For example, a I-II structure, I-II-I structure, I-II-II-I structure, (I-II-)$_4$M structure, I-II-I-II-I structure, or the like, where "I" represents polymer block I and "II" represents polymer block II may be adopted for the (d) component. Note that (I-II-)$_4$M is a reaction residue of a polyfunctional coupling agent such as silicon tetrachloride (M=Si) or tin tetrachloride (M=Sn), or a residue of an initiator such as a polyfunctional organolithium compound.

The (d) component may further include blocks other than the polymer block I and the polymer block II.

The molecular structure of a block copolymer in an unmodified or modified hydrogenated block copolymer used as the (d) component is not specifically limited and may, for example, be a linear structure, a branched structure, a radial structure, or a combination thereof.

In a case in which two or more polymer blocks I or two or more polymer blocks II are included in a block copolymer used as the (d) component, the polymer blocks I or II may each have the same structure or may have different structures.

From a viewpoint of improving fluidity of the (d) component, impact resistance, and external appearance, and reducing weld formation, the content of vinyl aromatic compound units in the block copolymer prior to hydrogenation is preferably 30 mass % or more, more preferably 32 mass % or more, and particularly preferably 40 mass % or more, and is preferably 50 mass % or less, and more preferably 48 mass % or less.

The vinyl aromatic compound content can be measured using an ultraviolet spectrophotometer.

The total content of 1,2-vinyl bonds and 3,4-vinyl bonds as a proportion relative to ethylenic double bonds in conjugated diene compound units included in the (d) component is preferably more than 50% and not more than 90%, and more preferably 60% to 90%.

The percentage hydrogenation of ethylenic double bonds in the block copolymer of the (d) component (double bonds in conjugated diene compound units) is preferably 80% to 100%, and more preferably 90% to 100%.

The number average molecular weight (Mn) of the pre-hydrogenation block copolymer in the (d) component is preferably 5,000 or more, more preferably 10,000 or more, and particularly preferably 30,000 or more, and is preferably 1,000,000 or less, more preferably 800,000 or less, and particularly preferably 500,000 or less.

The molecular weight distribution (Mw/Mn) of the pre-hydrogenation block copolymer is preferably 10 or less, more preferably 8 or less, and particularly preferably 5 or less.

The molecular weight distribution (Mw/Mn) can be calculated by dividing the weight average molecular weight (Mw) determined using GPC (mobile phase: chloroform; standard: polystyrene) by the previously described number average molecular weight (Mn).

The method by which the block copolymer is hydrogenated is not specifically limited and may, for example, be a method in which hydrogenation is performed under conditions of a reaction temperature of 0° C. to 200° C. and a hydrogen pressure of 0.1 MPa to 15 MPa using (1) a supported heterogeneous hydrogenation catalyst of a metal such as Ni, Pt, Pd, or Ru supported on carbon, silica, alumina, diatomaceous earth, or the like, (2) a Ziegler-type hydrogenation catalyst in which a transition metal salt such as an organic acid salt or acetylacetonate salt of Ni, Co, Fe, Cr, or the like and a reducing agent such as an organoaluminum reducing agent are used, or (3) a homogeneous hydrogenation catalyst such as an organometallic compound of Ti, Ru, Rh, Zr, or the like, referred to as an organometallic complex.

The method of synthesis of the block copolymer including the polymer block I and the polymer block II is not specifically limited and may, for example, be a commonly known method such as anionic polymerization.

The production method of the unmodified or modified hydrogenated block copolymer is not specifically limited and may be a commonly known production method such as a method described in JP S47-11486 A, JP S49-66743 A, JP S50-75651 A, JP S54-126255 A, JP S56-10542 A, JP S56-62847 A, JP S56-100840 A, JP H02-300218 A, GB 1130770 A, U.S. Pat. Nos. 3,281,383 A, 3,639,517 A, GB 1020720 A, U.S. Pat. No. 3,333,024 A, or 4,501,857 A.

The following describes matter relating, in particular, to a modified hydrogenated block copolymer that may be used as the (d) component.

Modified Hydrogenated Block Copolymer

The modified hydrogenated block copolymer is a product obtained through grafting or addition of an $\alpha,\beta$-unsaturated carboxylic acid or derivative thereof (for example, an acid anhydride or an ester) with the unmodified hydrogenated block copolymer described above.

The proportion of increase in mass through grafting or addition is not specifically limited, but relative to 100 mass % of the unmodified hydrogenated block copolymer, is preferably 0.01 mass % or more, and is preferably 10 mass % or less, more preferably 7 mass % or less, and particularly preferably 5 mass % or less.

The method by which the modified hydrogenated block copolymer is produced is not specifically limited and may, for example, be a method in which the unmodified hydrogenated block copolymer described above and an $\alpha,\beta$-unsaturated carboxylic acid or derivative thereof are reacted in a molten state, solution state, or slurry state at 80° C. to 350° C. in the presence or absence of a radical precursor.

((e) Phosphate Ester Compound)

Any type of phosphate ester compound (phosphate ester compound, condensed phosphate ester compound, etc.) that has an effect of improving resin composition flame retardance may, without any specific limitations, be used as (e) a phosphate ester compound that is optionally used in the present embodiment. Examples include triphenyl phosphate, phenyl bisdodecyl phosphate, phenyl bisneopentyl phosphate, phenyl-bis(3,5,5'-trimethyl-hexyl phosphate), ethyl diphenyl phosphate, 2-ethyl-hexyl di(p-tolyl)phosphate, bis (2-ethylhexyl)-p-tolyl phosphate, tritolyl phosphate, bis(2-ethylhexyl)phenyl phosphate, tri(nonylphenyl) phosphate, di(dodecyl)-p-tolyl phosphate, tricresyl phosphate, dibutylphenyl phosphate, 2-chloroethyl diphenyl phosphate, p-tolyl bis(2,5,5'-trimethylhexyl) phosphate, 2-ethylhexyl diphenyl phosphate, bisphenol A bis(diphenyl phosphate), diphenyl-(3-hydroxyphenyl) phosphate, bisphenol A bis(dicresyl phosphate), resorcinol bis(diphenyl phosphate), resorcinol bis(dixylenyl phosphate), 2-naphthyl diphenyl phosphate, 1-naphthyl diphenyl phosphate, and di(2-naphthyl)phenyl phosphate.

In particular, it is preferable that the (e) phosphate ester compound has, as a main component, at least one selected from the group consisting of aromatic condensed phosphate ester compounds represented by the following formula (4)

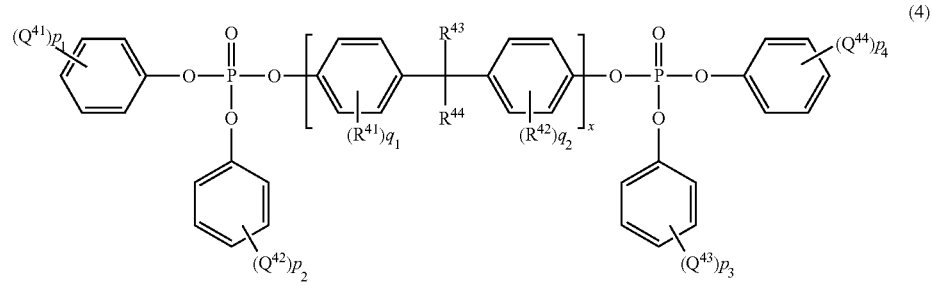

[in formula (4), $Q^{41}$, $Q^{42}$, $Q^{43}$, and $Q^{44}$ are each, independently of one another, an alkyl group having a carbon number of 1 to 6; $R^{41}$ and $R^{42}$ are each, independently of one another, a methyl group; $R^{43}$ and $R^{44}$ are each, independently of one another, a hydrogen atom or a methyl group; x is an integer of 0 or more; $p_1$, $p_2$, $p_3$, and $p_4$ are each an integer of 0 to 3; and $q_1$ and $q_2$ are each an integer of 0 to 2], and the following formula (5)

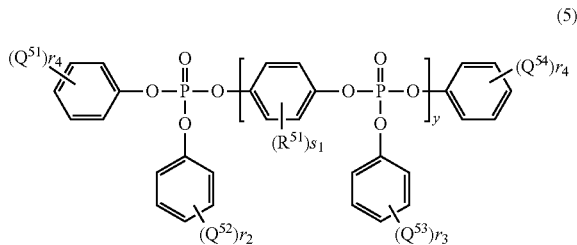

(5)

[in formula (5), $Q^{51}$, $Q^{52}$, $Q^{53}$, and $Q^{54}$ are each, independently of one another, an alkyl group having a carbon number of 1 to 6; $R^{51}$ is a methyl group; y is an integer of 0 or more; $r_1$, $r_2$, $r_3$, and $r_4$ are each an integer of 0 to 3; and $s_1$ is an integer of 0 to 2].

Note that the condensed phosphate ester compounds represented by formula (4) and formula (5) may each include a plurality of types of molecules, and n is preferably an integer of 1 to 3 for each of the molecules.

In a suitable (e) phosphate ester compound having at least one selected from the group consisting of condensed phosphate ester compounds represented by formula (4) and formula (5) as a main component, overall, the average value of x and/or y is preferably 1 or more. This suitable (e) phosphate ester compound can normally be acquired as a mixture containing 90% or more of compounds for which x and/or y are 1 to 3, and besides the compounds for which x and/or y are 1 to 3, also containing polymeric products for which x and/or y are 4 or more and other by-products.

((f) Phosphinate Salt)

In the present embodiment, (f) a phosphinate salt may be used as necessary. The (f) phosphinate salt may be at least one selected from the group consisting of:

a phosphinate salt represented by the following formula (1)

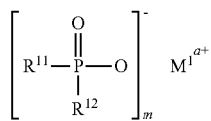

(1)

[in formula (1), $R^{11}$ and $R^{12}$ are each, independently of one another, a linear or branched alkyl group having a carbon number of 1 to 6 and/or an aryl group having a carbon number of 6 to 10; $M^1$ is at least one selected from the group consisting of a calcium ion, a magnesium ion, an aluminum ion, a zinc ion, a bismuth ion, a manganese ion, a sodium ion, a potassium ion, and a protonated nitrogenous base; a is an integer of 1 to 3; m is an integer of 1 to 3; and a·=m]; and a diphosphinate salt represented by the following formula (2)

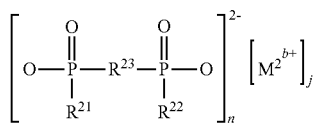

(2)

[in formula (2), $R^{21}$ and $R^{22}$ are each, independently of one another, a linear or branched alkyl group having a carbon number of 1 to 6 and/or an aryl group having a carbon number of 6 to 10; $R^{23}$ is a linear or branched alkylene group having a carbon number of 1 to 10, an arylene group having a carbon number of 6 to 10, an alkylarylene group having a carbon number of 6 to 10, or an arylalkylene group having a carbon number of 6 to 10; $M^2$ is at least one selected from the group consisting of a calcium ion, a magnesium ion, an aluminum ion, a zinc ion, a bismuth ion, a manganese ion, a sodium ion, a potassium ion, and a protonated nitrogenous base; b is an integer of 1 to 3; n is an integer of 1 to 3; j is an integer of 1 or 2; and b·j=2n].

Moreover, the (f) phosphinate salt may be a mixture of a phosphinate salt represented by formula (1) and a diphosphinate salt represented by formula (2).

Examples of such (f) phosphinate salts include, but are not specifically limited to, calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methane di(methylphosphinate), magnesium methane di(methylphosphinate), aluminum methane di(methylphosphinate), zinc methane di(methylphosphinate), calcium benzene-1,4-(dimethylphosphinate), magnesium benzene-1,4-(dimethylphosphinate), aluminum benzene-1,4-(dimethylphosphinate), zinc benzene-1,4-(dimethylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate. The (f) phosphinate salt is preferably calcium dimethylphosphinate, aluminum dimethylphosphinate, zinc dimethylphosphinate, calcium ethylmethylphosphinate, aluminum ethylmethylphosphinate, zinc ethylmethylphosphinate, calcium diethylphosphinate, aluminum diethylphosphinate, or zinc diethylphosphinate, and more preferably aluminum diethylphosphinate.

Examples of commercially available products that can be used as the (f) phosphinate salt include, but are not specifically limited to, Exolit® (Exolit is a registered trademark in Japan, other countries, or both) OP1230, OP1240, OP1311, OP1312, OP930, and OP935 produced by Clariant (Japan) K.K.

((g) Polypropylene Resin)

The composition of the present embodiment does not substantially contain (g) a polypropylene resin from a viewpoint of low-temperature impact resistance of the resin composition. The phrase "does not substantially contain" as used herein means that the content of the (g) polypropylene resin in the resin composition is less than 0.1%.

Examples of the (g) polypropylene resin include, but are not specifically limited to, propylene unit-containing polymers such as homopolypropylene, a copolymer including a polypropylene block, a modified polypropylene, and a mixture thereof.

The content of polypropylene resin in the resin composition can be determined, for example, by freeze pulverizing the resin composition into the form of a powder, subsequently dissolving the powder in 23° C. chloroform, collecting a fraction that dissolves in 150° C. o-dichlorobenzene from among insoluble content, and measuring the collected fraction by NMR.

((h) Thermoplastic Resin)

No specific limitations are placed on (h) thermoplastic resins other than the (a) to (d) components and the (g) component that may optionally be used in the present embodiment and examples thereof include polystyrene, syndiotactic polystyrene, and high-impact polystyrene.

((i) Other Additives)

No specific limitations are placed on (i) additives other than the (a) to (h) components that may optionally be used in the present embodiment and examples thereof include vinyl aromatic compound-conjugated diene compound block copolymers other than the (b) and (d) components, olefinic elastomers other than the (c) and (g) components, antioxidants, metal deactivators, heat stabilizers, flame retardants other than the (e) and (f) components (for example, ammonium polyphosphates, magnesium hydroxide, aromatic halogen-containing flame retardants, silicone flame retardants, and zinc borate), fluoropolymers, plasticizers (for example, low molecular weight polyethylene, epoxidized soybean oil, polyethylene glycol, and fatty acid esters), flame retardant synergists such as antimony trioxide, weather (light) resistance enhancers, nucleating agents for polyolefins, slip agents, various colorants, and release agents.

The following describes the proportions of components in the resin composition of the present embodiment.

From a viewpoint of increasing low-temperature impact resistance, chemical resistance, and dielectric breakdown strength of the resin composition and imparting sufficient rigidity for enabling adoption of the resin composition of the present embodiment for mechanism components and structures, the resin composition preferably contains 50 parts by mass to 90 parts by mass of the (a) component, 0 parts by mass to 30 parts by mass, in total, of the (b-1) and (b-2) components, and 0 parts by mass to 30 parts by mass of the (c) component relative to 100 parts by mass, in total, of the (a) to (c) components, and more preferably contains 60 parts by mass to 85 parts by mass of the (a) component, 0 parts by mass to 25 parts by mass, in total, of the (b-1) and (b-2) components, and 0 parts by mass to 25 parts by mass of the (c) component relative to 100 parts by mass, in total, of the (a) to (c) components.

The content of the (d) compatibilizer is preferably 1 part by mass to 20 parts by mass relative to 100 parts by mass, in total, of the (a) to (c) components from a viewpoint of balance of mechanical properties of the composition.

Moreover, the content of the (e) phosphate ester compound is preferably 5 parts by mass to 30 parts by mass relative to 100 parts by mass, in total, of the (a) to (d) components from a viewpoint of balance of mechanical properties of the composition.

Also, the content of the (f) phosphinate salt is preferably 3 parts by mass to 30 parts by mass, and more preferably 4 parts by mass to 27 parts by mass relative to 100 parts by mass, in total, of the (a) to (d) components from a viewpoint of balance of mechanical properties and flame retardance of the resin composition.

Furthermore, the content of the (h) thermoplastic resin is not specifically limited so long as the effects of the present disclosure are not lost and may, for example, be set as 0 parts by mass to 400 parts by mass relative to 100 parts by mass, in total, of the (a) to (d) components.

In a case in which the resin composition of the present embodiment contains the (b-1) component, the (b-2) component, and the (d) component, the resin composition preferably contains 50 parts by mass to 80 parts by mass of the (a) component, 5 parts by mass to 30 parts by mass, in total, of the (b-1) and (b-2) components, and 1 part by mass to 20 parts by mass of the (d) component relative to 100 parts by mass, in total, of the (a), (b-1), (b-2), and (d) components, and more preferably contains 60 parts by mass to 80 parts by mass of the (a) component, 10 parts by mass to 30 parts by mass, in total, of the (b-1) and (b-2) components, and 5 parts by mass to 20 parts by mass of the (d) component relative to 100 parts by mass, in total, of the (a), (b-1), (b-2), and (d) components from a viewpoint of increasing low-temperature impact resistance, chemical resistance, and dielectric breakdown strength of the resin composition and imparting sufficient rigidity for enabling adoption of the resin composition for mechanism components and structures.

In a case in which the resin composition of the present embodiment contains the (c) component and the (d) component, the resin composition preferably contains 50 parts by mass to 80 parts by mass of the (a) component, 5 parts by mass to 30 parts by mass of the (c) component, and 1 part by mass to 20 parts by mass of the (d) component relative to 100 parts by mass, in total, of the (a), (c), and (d) components, and more preferably contains 60 parts by mass to 80 parts by mass of the (a) component, 10 parts by mass to 30 parts by mass of the (c) component, and 5 parts by mass to 20 parts by mass of the (d) component relative to 100 parts by mass, in total, of the (a), (c), and (d) components from a viewpoint of increasing low-temperature impact resistance, chemical resistance, and dielectric breakdown strength of the resin composition and imparting sufficient rigidity for enabling adoption of the resin composition for mechanism components and structures.

(Flexural Modulus)

The flexural modulus of the resin composition of the present embodiment as measured in accordance with ISO 178 is 1,600 MPa or more, and is preferably 1,700 MPa to 3,000 MPa. When the flexural modulus is within any of the ranges set forth above, the resin composition can be provided with rigidity that enables adoption in structural components and structures.

The flexural modulus can be set as 1,600 MPa or more by appropriate adjustment through inclusion of the specific (a) to (c) components and the (d), (e), (g), and (h) components as necessary in specific amounts.

(Morphology)

In the morphology of the resin composition of the present embodiment, the (a) polyphenylene ether resin is required to be a continuous phase from a viewpoint of mechanical strength and chemical resistance. Moreover, from a viewpoint of obtaining even better chemical resistance, it is preferable that at least part of the (b-1) component and/or the (b-2) component forms worm-like domains, and more preferable that all of the (b-1) component and all of the (b-2) component form worm-like domains.

The morphology of the resin composition can be observed, for example, using a transmission electron microscope (TEM) after dyeing (b-1) component and (b-2) component portions with osmium tetroxide.

Herein, "form worm-like domains" means that block copolymers of the (b-1) and (b-2) components are domains having worm-like thin and elongated structures formed with bends or branches. In the "worm-like" shape referred to in the present embodiment, the domains may bend and trace arcs, may split into two or more branches, and may be repeatedly linked.

Figure 2:
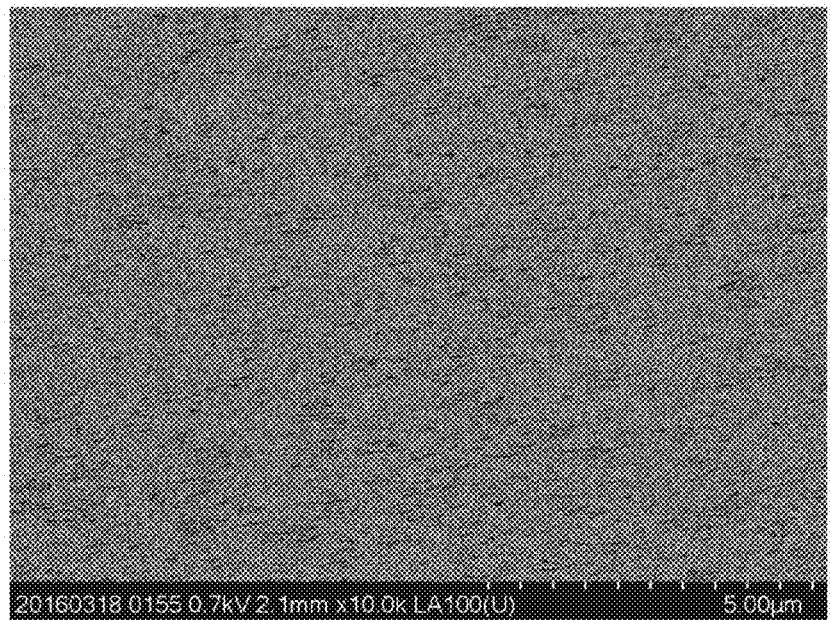
FIG. 2 is an image of a resin composition of Comparative Example 1 in which worm-like domains are not formed, as observed using a TEM.

FIG. 1 is an image of a resin composition including a continuous phase 2 and a worm-like domain 1 as observed using a TEM, and FIG. 2 is an image of a resin composition that does not include worm-like domains. The dyed portions in FIG. 1 are worm-like domains containing the (b-1) and (b-2) components.

The morphology of the (b-1) and (b-2) components can be controlled to be "worm-like" by, for example, adjusting the structure and molecular weight of each block portion in the (b-1) and (b-2) components, and appropriately selecting the type of the (d) compatibilizer.

The length of the worm-like domains is preferably 0.1 μm to 10.0 μm, and more preferably 0.1 μm to 5.0 μm from a viewpoint of obtaining even better chemical resistance.

Moreover, the width of the worm-like domains is preferably 0.01 to 1.0 μm, and more preferably 0.02 μm to 0.5 μm from a viewpoint of obtaining even better chemical resistance.

Also, the aspect ratio of the worm-like domains is preferably 5 to 1,000, and more preferably 10 to 500 from a viewpoint of obtaining even better chemical resistance.

Furthermore, the maximum distance between the worm-like domains is preferably 0.005 μm to 0.2 μm, and more preferably 0.01 μm to 0.15 μm from a viewpoint of obtaining even better chemical resistance. The maximum distance between the worm-like domains refers to the largest distance among distances between worm-like domains measured by inspecting 100 arbitrary worm-like domains in an image of an arbitrary cross-section of the resin composition observed using a TEM.

The proportion constituted by the worm-like domains in the resin composition is preferably 5% to 50%, and more preferably 10% to 50% from a viewpoint of obtaining even better chemical resistance. Note that the proportion constituted by the worm-like domains in the resin composition refers to the proportion of area constituted by worm-like domains in an arbitrarily selected 100 μm$^2$ region of an image of an arbitrary cross-section of the resin composition observed using a TEM.

Dimensions and the like of the worm-like domains can be measured using an image taken by a TEM after dyeing has been carried out with osmium tetroxide.

The (c) component is preferably dispersed in the resin composition from a viewpoint of obtaining even better mechanical strength and chemical resistance. Moreover, the (c) component is preferably dispersed with an average minor axis diameter of 2 μm or less, and is more preferably dispersed with an average minor axis diameter of 1.5 μm or less from a viewpoint of obtaining even better mechanical strength and chemical resistance. Furthermore, the (c) component is preferably dispersed with an average major axis diameter/average minor axis diameter of 1 to 10 from a viewpoint of obtaining even better mechanical strength and chemical resistance. In particular, the (c) component is preferably dispersed with an average minor axis diameter of 2 μm or less and average major axis diameter/average minor axis diameter of 1 to 10.

Such morphologies can be measured by a method described in the subsequent EXAMPLES section and may, for example, be observed using a transmission electron microscope (TEM).

The morphology of the resin composition can be adjusted, for example, by adjusting the structure and molecular weight of each block portion of the (b-1) component and/or the (b-2) component, adjusting the structure and molecular weight of the (c) component, and selecting an appropriate type of (d) component.

(Method of Producing Resin Composition)

The resin composition of the present embodiment can be produced by melt-kneading the (a) to (c) components set forth above, and also the (d), (e), (f), and (h) components set forth above as necessary.

A preferable method of producing the resin composition of the present embodiment is a production method including the following steps (1-1) and (1-2).

(1-1): A step of melt-kneading the (a) component and also the (d) component as necessary to obtain a kneaded product (1-2): A step of adding the (b-1) and (b-2) components and/or the (c) component to the kneaded product obtained in step (1-1) and performing melt-kneading thereof In step (1-1), all or some of the (a) component may be added. In addition, all or some of the (d) component may be added. In particular, step (1-1) is preferably a step in which all of the (a) component and all or some of the (d) component, as necessary, are melt-kneaded to obtain a kneaded product.

In step (1-2), all or some of each of the (b-1) component, the (b-2) component, and the (c) component may be added. In a case in which only some of any of these components is added in step (1-2), all of each of the (b-1) component, the (b-2) component, and the (c) component may be added in step (1-1) and step (1-2). Step (1-2) is preferably a step in which all of each of the (b-1) component, the (b-2) component, and the (c) component is added to the kneaded product obtained in step (1-1) and melt-kneading thereof is performed.

By adding the (b-1) component, the (b-2) component, and the (c) component in step (1-2) during melt-kneading as in the production method described above, and particularly by adding all of each of the (b-1) component, the (b-2) component, and the (c) component in step (1-2), the (b-1) component, the (b-2) component, and the (c) component are efficiently dispersed in the (a) component, and a resin composition having even better chemical resistance is obtained.

Examples of melt-kneading machines that can suitably be used to perform melt-kneading of the components in the production method of the resin composition of the present embodiment include, but are not specifically limited to, heated melt-kneading machines such as an extruder (for example, a single screw extruder or a multiscrew extruder such as a twin screw extruder), a roller, a kneader, a Brabender Plastograph, and a Banbury mixer. In particular, a twin screw extruder is preferable from a viewpoint of kneading performance. Specific examples of twin screw extruders that can be used include the ZSK series produced by Coperion Inc., the TEM series produced by Toshiba Machine Co., Ltd., and the TEX series produced by The Japan Steel Works, Ltd.

The type, specifications, and so forth of the extruder are not specifically limited and may be commonly known examples thereof.

The following describes a preferred embodiment of a case in which an extruder such as a single screw extruder, twin screw extruder, or other multiscrew extruder is used.

L/D of the extruder (barrel effective length/barrel internal diameter) is preferably 20 or more, and more preferably 30 or more, and is preferably 75 or less, and more preferably 60 or less.

The configuration of the extruder may be, but is not specifically limited to, a configuration in which, in the direction of raw material flow, a first raw material feeding inlet is located at an upstream side, a first vacuum vent is located further downstream than the first raw material feeding inlet, a second raw material feeding inlet is located further downstream than the first vacuum vent, a first liquid addition pump is located further downstream than the second raw material feeding inlet, a second vacuum vent is located further downstream than the first liquid addition pump, and a second liquid addition pump is located further downstream than the second vacuum vent.

The method by which a raw material is fed at the second raw material feeding inlet is not specifically limited and may be a method in which the raw material is simply added from an opening in an upper part of the raw material feeding inlet or a method in which the raw material is added from a side opening using a forced side feeder. In particular, a method in which the raw material is added from a side opening using a forced side feeder is preferable from a viewpoint of stable feeding.

In melt-kneading of the components, the melt-kneading temperature may be 200° C. to 370° C., but is not specifically limited thereto, and the screw speed may be 100 rpm to 1,200 rpm, but is not specifically limited thereto.

In a case in which a liquid raw material is to be added, the liquid raw material can be added by using a liquid addition pump or the like in a cylinder section of the extruder to directly feed the liquid raw material into the cylinder. The liquid addition pump may be, but is not specifically limited to, a gear pump, a flange pump, or the like, and is preferably a gear pump. In this case, from a viewpoint of reducing the load on the liquid addition pump and improving raw material operability, it is preferable to lower the viscosity of the liquid raw material by using a heater or the like to heat a tank in which the liquid raw material is stored or a section that forms a flow path of the liquid raw material, such as piping between the tank and the liquid addition pump and piping between the pump and the extruder cylinder.

[Shaped Product]

A shaped product of the present embodiment is formed from the resin composition of the present embodiment set forth above.

The shaped product of the present embodiment is not specifically limited and examples thereof include automotive components, interior and exterior components of electrical devices, other components, and so forth. Examples of automotive components include, but are not specifically limited to, exterior components such as bumpers, fenders, door panels, various moldings, emblems, engine hoods, wheel caps, roofs, spoilers, and various aero parts; interior components such as instrument panels, console boxes, and trims; battery case components for secondary batteries installed in vehicles, electric vehicles, hybrid electric vehicles, and the like; and lithium ion secondary battery components. Examples of interior and exterior components of electrical devices include, but are not specifically limited to, components used in various computers and peripheral equipment thereof, junction boxes, various connectors, other OA equipment, televisions, video devices, cabinets for various disc players and the like, chassis, refrigerators, air conditioners, and LCD projectors. Examples of other components include electrical wires and cables obtained by applying a coating on a metal conductor or optical fiber, fuel cases for solid methanol batteries, water pipes for fuel cells, water cooling tanks, boiler exterior cases, ink peripheral components and parts for inkjet printers, furniture (chairs, etc.), chassis, water piping, and joints.

(Method of Producing Shaped Product)

The shaped product of the present embodiment can be produced through shaping of the resin composition of the present embodiment set forth above.

The production method of the shaped product of the present embodiment may be, but is not specifically limited to, injection molding, extrusion molding, profile extrusion molding, blow molding, compression molding, or the like, and is preferably injection molding from a viewpoint of more effectively obtaining the effects of the present disclosure.

EXAMPLES

The following describes the embodiment of the present disclosure through examples, but the present disclosure is not limited to these examples.

Raw materials used for resin compositions and shaped products in the examples and comparative examples were as follows.

(a) Polyphenylene Ether Resin (a-i)

Polyphenylene ether obtained through oxidative polymerization of 2,6-xylenol and having a reduced viscosity ($\eta_{sp}/c$: 0.5 g/dL chloroform solution) of 0.51 dL/g (a-ii)

Polyphenylene ether obtained through oxidative polymerization of 2,6-xylenol and having a reduced viscosity ($\eta_{sp}/c$: 0.5 g/dL chloroform solution) of 0.42 dL/g Note that the reduced viscosity was measured as $\eta_{sp}/c$ of a 0.5 g/dL chloroform solution at a temperature of 30° C. using an Ubbelohde viscometer.

(b) Hydrogenated Block Copolymer

Unmodified block copolymers were synthesized with polymer blocks A formed from polystyrene and polymer blocks B formed from polybutadiene. The physical properties of the obtained block copolymers were as follows.

(b-i)

Mixture of (b-i-1) and (b-i-2) shown below (b-i-2)

Polystyrene content in block copolymer prior to hydrogenation: 30 mass %

Peak molecular weight of block copolymer after hydrogenation: 65,000

Number average molecular weight (Mn) of polystyrene blocks: 19,500

Number average molecular weight (Mn) of polybutadiene blocks: 45,500

Molecular weight distribution (Mw/Mn) of block copolymer prior to hydrogenation: 1.10

Content of 1,2-vinyl bonds (content of all vinyl bonds) in polybutadiene blocks prior to hydrogenation: 40%

Percentage hydrogenation of polybutadiene portion forming polybutadiene blocks: 35%

Glass transition temperature of polybutadiene blocks after hydrogenation: −80° C.

(b-i-1)

Polystyrene content in block copolymer prior to hydrogenation: 30 mass %

Peak molecular weight of block copolymer after hydrogenation: 125,000

Number average molecular weight (Mn) of polystyrene blocks: 18,750

Number average molecular weight (Mn) of polybutadiene blocks: 87,500

Molecular weight distribution (Mw/Mn) of block copolymer prior to hydrogenation: 1.10

Content of 1,2-vinyl bonds (content of all vinyl bonds) in polybutadiene blocks prior to hydrogenation: 40%

Percentage hydrogenation of polybutadiene portion forming polybutadiene blocks: 35%

Glass transition temperature of polybutadiene blocks after hydrogenation: −80° C.

Mixing ratio (b-i-1):(b-i-2)=30:70

The vinyl aromatic compound content was measured using an ultraviolet spectrophotometer. The number average molecular weight (Mn) and peak molecular weight were determined by GPC (mobile phase: chloroform; standard: polystyrene). The molecular weight distribution (Mw/Mn) was calculated by determining the weight average molecular weight (Mw) by GPC (mobile phase: chloroform; standard: polystyrene) using a conventional and commonly known method, and then dividing the weight average molecular weight (Mw) by the number average molecular weight (Mn). The content of all vinyl bonds was determined through measurement using an infrared spectrophotometer and calculation in accordance with the method described in Analytical Chemistry, Volume 21, No. 8, August 1949. The percentage hydrogenation was measured using a nuclear magnetic resonance (NMR) spectrometer. The mixing ratio was determined from a peak area ratio in GPC measurement.

(b-ii)

Mixture of same components as (b-i-1) and (b-i-2) described in (b-i) for which (b-i-1):(b-i-2)=5:95

(b-iii)

Mixture of same components as (b-i-1) and (b-i-2) described in (b-i) for which (b-i-1):(b-i-2)=55:45

(b-iv)

Mixture of (b-iv-1) and (b-iv-2) shown below (b-iv-2)

Polystyrene content in block copolymer prior to hydrogenation: 15 mass %

Peak molecular weight of block copolymer after hydrogenation: 70,000

Number average molecular weight (Mn) of polystyrene blocks: 10,500

Number average molecular weight (Mn) of polybutadiene blocks: 59,500

Molecular weight distribution (Mw/Mn) of block copolymer prior to hydrogenation: 1.10

Content of 1,2-vinyl bonds (content of all vinyl bonds) in polybutadiene blocks prior to hydrogenation: 41%

Percentage hydrogenation of polybutadiene portion forming polybutadiene blocks: 98%

Glass transition temperature of polybutadiene blocks after hydrogenation: −55° C.

(b-iv-1)

Polystyrene content in block copolymer prior to hydrogenation: 15 mass %

Peak molecular weight of block copolymer after hydrogenation: 130,000

Number average molecular weight (Mn) of polystyrene blocks: 9,750

Number average molecular weight (Mn) of polybutadiene blocks: 110,500

Molecular weight distribution (Mw/Mn) of block copolymer prior to hydrogenation: 1.10

Content of 1,2-vinyl bonds (content of all vinyl bonds) in polybutadiene blocks prior to hydrogenation: 41%

Percentage hydrogenation of polybutadiene portion forming polybutadiene blocks: 98%

Glass transition temperature of polybutadiene blocks after hydrogenation: −55° C.

(b-iv-1):(b-iv-2)=30:70

(b-v-x)

Mixture of (b-v-1) and (b-v-2) shown below (b-v-1)

Polystyrene content in block copolymer prior to hydrogenation: 20 mass %

Peak molecular weight of block copolymer after hydrogenation: 100,000

Number average molecular weight (Mn) of polystyrene blocks: 20,000

Number average molecular weight (Mn) of polybutadiene blocks: 80,000

Molecular weight distribution (Mw/Mn) of block copolymer prior to hydrogenation: 1.10

Content of 1,2-vinyl bonds (content of all vinyl bonds) in polybutadiene blocks prior to hydrogenation: 50%

Percentage hydrogenation of polybutadiene portion forming polybutadiene blocks: 99%

Glass transition temperature of polybutadiene blocks after hydrogenation: −48° C.

(b-v-2)

Polystyrene content in block copolymer prior to hydrogenation: 20 mass %

Peak molecular weight of block copolymer after hydrogenation: 195,000

Number average molecular weight (Mn) of polystyrene blocks: 19,500

Number average molecular weight (Mn) of polybutadiene blocks: 156,000

Molecular weight distribution (Mw/Mn) of block copolymer prior to hydrogenation: 1.10

Content of 1,2-vinyl bonds (content of all vinyl bonds) in polybutadiene blocks prior to hydrogenation: 50%

Percentage hydrogenation of polybutadiene portion forming polybutadiene blocks: 99%

Glass transition temperature of polybutadiene blocks after hydrogenation: −48° C.

(b-v-1):(b-v-2)=30:70

(b-vi-x)

Mixture of (b-vi-1) and (b-vi-2) shown below (b-vi-1)

Polystyrene content in block copolymer prior to hydrogenation: 20 mass %

Peak molecular weight of block copolymer after hydrogenation: 70,000

Number average molecular weight (Mn) of polystyrene blocks: 14,000

Number average molecular weight (Mn) of polybutadiene blocks: 56,000

Molecular weight distribution (Mw/Mn) of block copolymer prior to hydrogenation: 1.10

Content of 1,2-vinyl bonds (content of all vinyl bonds) in polybutadiene blocks prior to hydrogenation: 50%

Percentage hydrogenation of polybutadiene portion forming polybutadiene blocks: 99%

Glass transition temperature of polybutadiene blocks after hydrogenation: −48° C.

(b-vi-2)

Polystyrene content in block copolymer prior to hydrogenation: 20 mass %

Peak molecular weight of block copolymer after hydrogenation: 130,000

Number average molecular weight (Mn) of polystyrene blocks: 13,000

Number average molecular weight (Mn) of polybutadiene blocks: 104,000

Molecular weight distribution (Mw/Mn) of block copolymer prior to hydrogenation: 1.10

Content of 1,2-vinyl bonds (content of all vinyl bonds) in polybutadiene blocks prior to hydrogenation: 50%

Percentage hydrogenation of polybutadiene portion forming polybutadiene blocks: 99%

Glass transition temperature of polybutadiene blocks after hydrogenation: −48° C.

(b-vi-1):(b-vi-2)=30:70

(c) Olefinic Polymer (c-i)

Ethylene-butene copolymer; TAFMER DF610 (product name) produced by Mitsui Chemicals, Inc.; MFR: 1.2 g/10 min (conditions: 190° C., 2.16 kgf); brittleness temperature: <−70° C.; density: 0.862 g/cm$^3$ (c-ii)

Ethylene-butene copolymer; TAFMER DF810 (product name) produced by Mitsui Chemicals, Inc.; MFR: 1.2 g/10 min (conditions: 190° C., 2.16 kgf); brittleness temperature: <−70° C.; density: 0.885 g/cm$^3$ (c-iii)

Ethylene-butene copolymer; TAFMER DF110 (product name) produced by Mitsui Chemicals, Inc.; MFR: 1.2 g/10 min (conditions: 190° C., 2.16 kgf); brittleness temperature: <−70° C.; density: 0.905 g/cm$^3$ (c-iv-x)

TAFMER BL3450M (product name) produced by Mitsui Chemicals, Inc.; MFR: 4.0 g/10 min (conditions: 190° C., 2.16 kgf); brittleness temperature: −32° C.

(c-v)

Low-density polyethylene; MFR: 2.0 g/10 min (conditions: 190° C., 2.16 kgf); brittleness temperature: −80° C.; density: 0.918 g/cm$^3$ (d) Compatibilizer A block copolymer having a II-I-II-I block structure in which the polymer blocks I were formed from polystyrene and the polymer blocks II were formed from polybutadiene was synthesized by a commonly known method. The synthesized block copolymer was hydrogenated by a commonly known method. Modification of the polymer was not carried out. The physical properties of the unmodified hydrogenated block copolymer that was obtained were as follows.

Polystyrene content in block copolymer prior to hydrogenation: 44 mass %

Peak molecular weight of block copolymer after hydrogenation: 95,000

Number average molecular weight (Mn) of polystyrene blocks: 41,800

Number average molecular weight (Mn) of polybutadiene blocks: 53,200

Molecular weight distribution (Mw/Mn) of block copolymer prior to hydrogenation: 1.06

Content of 1,2-vinyl bonds (content of all vinyl bonds) in polybutadiene blocks prior to hydrogenation: 75%

Percentage hydrogenation of polybutadiene portion forming polybutadiene blocks: 99%

Glass transition temperature of polybutadiene blocks after hydrogenation: −15° C.

(e) Phosphate Ester Compound (e)

E890 (condensed phosphate ester compound) produced by Daihachi Chemical Industry Co., Ltd.

(f) Phosphinate Salt (f)

Exolit OP1230 (corresponding to formula (1)) produced by Clariant (Japan) K.K.

(g) Polypropylene Resin (g-i)

Propylene homopolymer; melting point: 165° C.; MFR: 6.0 g/10 min (conditions: 190° C., 2.16 kgf)

(g-ii)

WELNEX RFX4V (ethylene-propylene copolymer) produced by Japan Polypropylene Corporation; MFR: 6.0 g/10 min (conditions: 190° C., 2.16 kg); density: 0.890 g/cm$^3$ Measurement methods (1) to (6) for physical properties in the examples and comparative examples are described below.

(1) Flexural Modulus

Obtained resin composition pellets were fed into a small-size injection molding machine (product name: IS-100GN; produced by Toshiba Machine Co., Ltd.) set to a cylinder temperature of 280° C. and were molded under conditions of a mold temperature of 70° C., an injection pressure of 70 MPa, an injection time of 20 s, and a cooling time of 15 s to prepare an ISO dumbbell for evaluation. The flexural modulus (MPa) of the ISO dumbbell was measured in accordance with ISO 178.

A larger value for the flexural modulus was judged to indicate better rigidity. In particular, in a case in which the flexural modulus was 1,600 MPa or more, the resin composition was judged to have rigidity enabling adoption for mechanism components and structures.

(2) Chemical Resistance

Obtained resin composition pellets were fed into a small-size injection molding machine (product name: IS-100GN; produced by Toshiba Machine Co., Ltd.) set to a cylinder temperature of 280° C. and were molded into the form of a 150 mm×150 mm×3 mm flat plate under conditions of a mold temperature of 70° C., an injection pressure of 75 MPa, an injection time of 20 s, and a cooling time of 15 s.

A specimen of 75 mm×12.7 mm×3 mm was cut out from the flat plate and was set in a bending form designed to enable continuous variation of strain of the specimen. A phthalate ester compound (bis(2-ethylhexyl) phthalate produced by Tokyo Chemical Industry Co., Ltd.) was applied onto the surface of the specimen and was left for 48 hours under conditions of 23° C. and 50% RH. After 48 hours had passed, strain was applied to the specimen and the end position of the bending form at which cracking of the surface of the specimen occurred was measured to determine the critical strain (%), which indicates strain at the limit at which cracking does not occur.

In terms of evaluation criteria, a larger value for the critical strain was judged to indicate better chemical resistance.

(3) Falling Weight Impact Strength

Obtained resin composition pellets were fed into a small-size injection molding machine (product name: IS-100GN; produced by Toshiba Machine Co., Ltd.) set to a cylinder temperature of 280° C. and were molded into the form of a 50 mm×90 mm×2 mm flat plate under conditions of a mold temperature of 70° C., an injection pressure of 70 MPa, an injection time of 20 s, and a cooling time of 10 s.

The obtained flat plate was subjected to a falling weight impact test in accordance with JIS K 7211-1 in a −40° C. environment using a striker having a point diameter of 12.7 mm. The total absorbed energy (J) required to break the specimen was measured.

A larger value was judged to indicate better low-temperature impact resistance.

(4) Tracking Resistance

Obtained resin composition pellets were fed into a small-size injection molding machine (product name: IS-100GN; produced by Toshiba Machine Co., Ltd.) set to a cylinder temperature of 280° C. and were molded into the form of a 120 mm×80 mm×3 mm flat plate under conditions of a mold temperature of 70° C. and an injection pressure of 70 MPa. A 20 mm×20 mm×3 mm flat plate was cut out from the obtained flat plate and was used to measure the maximum voltage (V) at which tracking breakdown did not occur in accordance with IEC 60112:2003 (used electrolyte: solution A; number of drops: 50), and thereby evaluate tracking resistance.

A larger value was judged to indicate better tracking resistance.

(5) Flame Retardance

Obtained resin composition pellets were fed into a small-size injection molding machine (product name: IS-100GN; produced by Toshiba Machine Co., Ltd.) set to a cylinder temperature of 280° C. and were molded under conditions of a mold temperature of 70° C. and an injection pressure of 60 MPa to prepare five specimens (thickness: 1.6 mm) for UL94 vertical burning test measurement. The flame retardance of these five specimens was evaluated based on the UL94 vertical burning test method. A flame was brought into contact with each specimen for 10 seconds and then removed, and the burning time until a flame on the specimen was extinguished after removal was taken to be t1 (s). Thereafter, a flame was brought into contact with the specimen for a further 10 seconds and then removed, and the burning time until a flame on the specimen was extinguished after removal was taken to be t2 (s). For each of the five specimens, the average value of t1 and t2 was determined as the average burning time. Moreover, a longest burning time among the 10 measurements of t1 and t2 was determined as the longest burning time. A judgment of V-0, V-1, V-2, or HB was made based on UL94 regulations.

In particular, a resin composition was judged to have excellent flame retardance when the flame retardance level was determined to be V-1 or higher.

(6) Morphology

An ultramicrotome was used to prepare an ultrathin slice from an ISO dumbbell for evaluation prepared in the same way as for "(1) Flexural modulus". Thereafter, the (b-1) component and the (b-2) component in the ultrathin slice were dyed with osmium tetroxide. A TEM (product name: HT7700; produced by Hitachi High-Technologies Corporation) was used to observe the ultrathin slice that had been dyed and acquire an image thereof at ×10,000 magnification. The image was inspected to judge whether the (b-1) component and the (b-2) component formed worm-like domains. A judgment of "good" was made when an image was acquired in which worm-like domains were observed throughout the image (for example, 70% or more of the whole image), and a judgment of "poor" was made when such an image was not acquired.

Herein, worm-like domains formed by the (b-1) component and the (b-2) component are portions such as indicated by reference sign 1 in FIG. 1 and the continuous phase is a portion such as indicated by reference sign 2 in FIG. 1. Note that FIG. 1 is an image of Example 1 and FIG. 2 is an image of Comparative Example 1.

In relation to whether or not the (a) component formed a continuous phase, a judgment of "good" was made when the (a) component formed a continuous phase in the image acquired as described above (inclusive of a case in which the (a) component and another component are co-continuous), and a judgment of "poor" was made when the (a) component was a dispersed phase.

The same image was used to judge whether the (c) component was dispersed in the resin composition. Moreover, the minor axis diameter (μm) and the major axis diameter (μm) of 100 domains of the (c) component were measured, and the measured values were averaged to determine the average minor axis diameter (μm) and the average major axis diameter (μm). A judgment of "good" was made when the average minor axis diameter of the (c) component was 2 μm or less and the ratio of the average major axis diameter relative to the average minor axis diameter (average major axis diameter/average minor axis diameter) was 1 to 10, and a judgment of "poor" was made when this was not the case.

Examples 1 to 39 and Comparative Examples 1 to 24

The following describes the examples and comparative examples in detail.

A twin screw extruder (ZSK-25 produced by Coperion Inc.) was used as a melt-kneading machine in production of a resin composition in each of the examples and comparative examples. L/D of the extruder was 35.

The twin screw extruder had a configuration including, in a direction of raw material flow, a first raw material feeding inlet located at an upstream side, a first vacuum vent located further downstream than the first raw material feeding inlet, a second raw material feeding inlet located further downstream than the first vacuum vent, a liquid addition pump located further downstream than the second raw material feeding inlet, and a second vacuum vent located further downstream than the liquid addition pump.

Resin composition pellets were produced under conditions in which the barrel temperature setting of the twin screw extruder was 320° C. from the first raw material feeding inlet to the first vacuum vent and 270° C. downstream from the second raw material feeding inlet, the screw speed was 300 rpm, and the extrusion rate was 15 kg/h. The configuration of the twin screw extruder is illustrated in Table 1.

TABLE 1

| | First raw material feeding inlet C1 | C2 | C3 | C4 | First vacuum vent C5 | Second raw material feeding inlet C6 | Liquid addition pump C7 | C8 | C9 | C10 | Second vacuum vent C11 | C12 |
|---|---|---|---|---|---|---|---|---|---|---|---|---|
| Temperature setting | | 320° C. | | | | | 270° C. | | | | | |

Resin composition pellets were obtained by feeding (a) to (g) components, as indicated in Tables 2 and 3, into the twin screw extruder that had been set as described above.

Physical property tests were carried out by the previously described measurement methods (1) to (6) in each of the examples and comparative examples. The results are shown in Tables 2 and 3.

TABLE 2-1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Production method of resin composition | First raw material feeding inlet | Component (a-i) Parts by mass | 79 | 79 | 79 | 79 | 79 | 79 | — | 83.5 | 89 | 79 |
| | | Component (a-ii) Parts by mass | — | — | — | — | — | — | 79 | — | — | — |
| | | Component (b-i) Parts by mass | 21 | — | — | — | — | — | — | — | — | — |
| | | Component (c-iii) Parts by mass | — | — | — | — | — | — | — | — | — | — |
| | | Component (d) Parts by mass | 5 | 5 | — | 5 | 5 | 5 | 5 | 0.5 | 5 | 5 |
| | Second raw material feeding inlet | Component (b-i) Parts by mass | — | 21 | 21 | — | — | — | 20 | 16.5 | 11 | 21 |
| | | Component (b-iii) Parts by mass | — | — | — | 21 | — | — | — | — | — | — |
| | | Component (b-iv) Parts by mass | — | — | — | — | 21 | — | — | — | — | — |
| | | Component (c-i) Parts by mass | — | — | — | — | — | 21 | — | — | — | — |
| | | Component (c-ii) Parts by mass | — | — | — | — | — | — | — | — | — | — |
| | | Component (c-iii) Parts by mass | — | — | — | — | — | — | — | — | — | — |
| | | Component (c-v) Parts by mass | — | — | — | — | — | — | — | — | — | — |
| | | Component (f) Parts by mass | — | — | — | — | — | — | — | — | — | — |
| | Liquid addition pump | Component (e) Parts by mass | — | — | — | — | — | — | — | — | — | 18 |
| Evaluation | | Formation of continuous phase by (a) component | Good | Good | Good | Good | Good | Good | Good | Good | Good | Good |
| | | Formation of worm-like domains by (b) component | Good | Good | Poor | Good | Good | Good | Good | Poor | Good | Good |
| | | Average minor axis diameter of 2 μm or less and average major axis diameter/average minor axis diameter of 1 to 10 for (c) component | — | — | — | — | — | — | — | — | — | — |
| | | (1) Flexural modulus MPa | 2230 | 2250 | 2360 | 2270 | 2290 | 2200 | 2200 | 2340 | 2310 | 2000 |
| | | (2) Chemical resistance % | 1.19 | 1.25 | 0.87 | 1.11 | 1.13 | 1.18 | 1.21 | 0.88 | 0.82 | 1.01 |
| | | (3) Falling weight impact strength J | 6.8 | 7.7 | 4.2 | 6.1 | 6.2 | 4.9 | 7.4 | 4.4 | 4.3 | 6.0 |
| | | (4) Tracking resistance V | 575 | >600 | 450 | 575 | 575 | >600 | >600 | 450 | 450 | 550 |
| | | (5) Flame retardance Rank | — | — | — | — | — | — | — | — | — | V-1 |

TABLE 2-1-continued

| | | | Example 11 | Example 12 | Example 13 | Example 14 | Example 15 | Example 16 | Example 17 | Example 18 | Example 19 |
|---|---|---|---|---|---|---|---|---|---|---|---|
| Production method of resin composition | First raw material feeding inlet | Component (a-i) Parts by mass | 79 | 79 | 79 | 79 | — | 72 | 88 | 79 | 79 |
| | | Component (a-ii) Parts by mass | — | — | — | — | 79 | — | — | — | — |
| | | Component (b-i) Parts by mass | — | — | — | — | — | — | — | — | — |
| | | Component (c-iii) Parts by mass | — | — | — | — | — | — | — | 21 | — |
| | | Component (d) Parts by mass | 5 | 5 | 5 | 5 | 5 | 10 | 15 | 5 | 5 |
| | Second raw material feeding inlet | Component (b-i) Parts by mass | 21 | — | — | — | — | 28 | 12 | — | — |
| | | Component (b-ii) Parts by mass | — | 21 | 21 | — | 21 | — | — | — | — |
| | | Component (b-iii) Parts by mass | — | — | — | 21 | — | — | — | — | 21 |
| | | Component (b-iv) Parts by mass | — | — | — | — | — | — | — | — | — |
| | | Component (c-i) Parts by mass | — | — | — | — | — | — | — | — | — |
| | | Component (c-ii) Parts by mass | — | — | — | — | — | — | — | — | — |
| | | Component (c-iii) Parts by mass | — | — | — | — | — | — | — | — | — |
| | | Component (c-v) Parts by mass | — | — | — | — | — | — | — | — | — |
| | Liquid addition pump | Component (f) Parts by mass | 5 | 5 | 5 | 5 | 5 | 5 | 5 | — | — |
| | | Component (e) Parts by mass | 18 | 18 | 18 | 18 | 18 | 18 | 18 | — | — |
| Evaluation | | Formation of continuous phase by (a) component | Good | Good | Good | Good | Good | Good | Good | Good | Good |
| | | Formation of worm-like domains by (b) component | Good | Good | Good | Good | Good | Good | Good | — | — |
| | | Average minor axis diameter of 2 μm or less and average major axis diameter/average minor axis diameter of 1 to 10 for (c) component | — | — | — | — | — | — | — | Good | Good |
| | | (1) Flexural modulus MPa | 2100 | 2130 | 2150 | 2110 | 2020 | 1610 | 2140 | 2280 | 2190 |
| | | (2) Chemical resistance % | 1.09 | 1.04 | 1.07 | 1.01 | 1.10 | 1.21 | 0.96 | 1.27 | 1.26 |
| | | (3) Falling weight impact strength J | 6.1 | 5.5 | 5.7 | 6.0 | 5.5 | 5.9 | 5.1 | 5.2 | 6.0 |
| | | (4) Tracking resistance V | 575 | 575 | 575 | 575 | 575 | >600 | 500 | 575 | >600 |
| | | (5) Flame retardance Rank | V-0 | V-0 | V-0 | V-0 | V-0 | V-0 | V-0 | — | — |

TABLE 2-1-continued

| | | | Example 20 | Example 21 | Example 22 | Example 23 | Example 24 | Example 25 | Example 26 | Example 27 | Example 28 | Example 29 |
|---|---|---|---|---|---|---|---|---|---|---|---|---|
| Production method of resin composition | First raw material feeding inlet | Component (a-i) | Parts by mass | 79 | 79 | 79 | 79 | — | 83.5 | 89 | 79 | 79 | 79 |
| | | Component (a-ii) | Parts by mass | — | — | — | — | 79 | — | — | — | — | — |
| | | Component (b-i) | Parts by mass | — | — | — | — | — | — | — | — | — | — |
| | | Component (c-iii) | Parts by mass | — | — | — | — | — | — | — | — | — | — |
| | | Component (d) | Parts by mass | 5 | 5 | — | 5 | 5 | 0.5 | 5 | 5 | 5 | 5 |
| | Second raw material feeding inlet | Component (b-i) | Parts by mass | — | — | — | — | — | — | — | — | — | — |
| | | Component (b-iii) | Parts by mass | — | — | — | — | — | — | — | — | — | — |
| | | Component (b-iv) | Parts by mass | — | — | — | — | — | — | — | — | — | — |
| | | Component (c-i) | Parts by mass | 21 | 21 | 21 | — | 21 | 16.5 | 11 | — | 21 | 21 |
| | | Component (c-ii) | Parts by mass | — | — | — | 21 | — | — | — | 21 | — | — |
| | | Component (c-iii) | Parts by mass | — | — | — | — | — | — | — | — | — | — |
| | | Component (c-v) | Parts by mass | — | — | — | — | — | — | — | 5 | 5 | 5 |
| | Liquid addition pump | Component (f) | Parts by mass | — | — | — | — | — | — | — | — | — | — |
| | | Component (e) | Parts by mass | — | — | — | — | — | — | — | 18 | 18 | 18 |
| Evaluation | Formation of continuous phase by (a) component | | Good | Good | Good | Good | Good | Good | Good | Good | Good | Good |
| | Formation of worm-like domains by (b) component | | Good | Good | Poor | Good | Good | Poor | Good | Good | Good | Good |
| | Average minor axis diameter of 2 μm or less and average major axis diameter/average minor axis diameter of 1 to 10 for (c) component | | Good | Good | Good | Good | Good | Good | Good | Good | Good | Good |
| | (1) Flexural modulus | MPa | 2250 | 2310 | 2480 | 2380 | 2280 | 2420 | 2460 | 1970 | 2030 | 2080 |
| | (2) Chemical resistance | % | 1.31 | 1.38 | 1.14 | 1.21 | 1.28 | 0.95 | 0.85 | 1.22 | 1.24 | 1.20 |
| | (3) Falling weight impact strength | J | 5.8 | 5.4 | 3.9 | 4.7 | 5.1 | 2.8 | 2.4 | 5.6 | 5.1 | 4.2 |
| | (4) Tracking resistance | V | >600 | >600 | 575 | >600 | >600 | 450 | 450 | 575 | 575 | 550 |
| | (5) Flame retardance | Rank | — | — | — | — | — | — | — | V-0 | V-0 | V-1 |

TABLE 2-1-continued

| | | | Example 30 | Example 31 | Example 32 | Example 33 | Example 34 | Example 35 | Example 36 | Example 37 | Example 38 | Example 39 |
|---|---|---|---|---|---|---|---|---|---|---|---|---|
| Production method of resin composition | First raw material feeding inlet | Component (a-i) Parts by mass | 79 | 79 | — | 72 | 77 | 88 | 79 | 79 | 79 | 79 |
| | | Component (a-ii) Parts by mass | — | — | 79 | — | — | — | — | — | — | — |
| | | Component (b-i) Parts by mass | — | — | — | — | — | — | — | — | — | — |
| | | Component (c-iii) Parts by mass | — | — | — | — | — | — | — | — | — | — |
| | Second raw material feeding inlet | Component (d) Parts by mass | 5 | 5 | 5 | 10 | — | 15 | 5 | 5 | 5 | 5 |
| | | Component (b-ii) Parts by mass | — | — | — | — | 2 | — | 10.5 | 10.5 | 2 | 8.5 |
| | | Component (b-iii) Parts by mass | — | — | — | — | — | — | — | — | — | — |
| | | Component (b-iv) Parts by mass | — | — | — | — | — | — | — | — | — | — |
| | | Component (c-i) Parts by mass | — | — | — | — | — | — | — | — | — | — |
| | | Component (c-ii) Parts by mass | — | — | — | — | — | — | — | — | — | — |
| | | Component (c-iii) Parts by mass | 21 | — | 21 | 28 | 23 | 12 | 10.5 | 10.5 | 8.5 | 2 |
| | | Component (c-v) Parts by mass | — | 21 | — | — | — | — | — | — | — | — |
| | | Component (f) Parts by mass | 5 | 5 | 5 | 5 | 5 | 5 | — | 5 | 5 | 5 |
| | Liquid addition pump | Component (e) Parts by mass | 18 | 18 | 18 | 18 | 18 | 18 | — | 18 | 18 | 18 |
| Evaluation | | Formation of continuous phase by (a) component | Good | Good | Good | Good | Good | Good | Good | Good | Good | Good |
| | | Formation of worm-like domains by (b) component | — | — | — | — | — | — | Good | Good | Good | Good |
| | | Average minor axis diameter of 2 μm or less and average major axis diameter/average minor axis diameter of 1 to 10 for (c) component | Good | Good | Good | Good | Good | Good | Good | Good | Good | Good |
| | | (1) Flexural modulus MPa | 2090 | 2120 | 2040 | 1680 | 2070 | 2120 | 2250 | 2350 | 2370 | 2380 |
| | | (2) Chemical resistance % | 1.27 | 1.17 | 1.23 | 1.45 | 1.32 | 1.00 | 1.32 | 1.27 | 1.29 | 1.26 |
| | | (3) Falling weight impact strength J | 4.9 | 4.3 | 4.5 | 5.3 | 5.0 | 3.2 | 6.9 | 6.3 | 6.1 | 6.7 |
| | | (4) Tracking resistance V | 575 | >600 | 550 | >600 | 575 | 475 | >600 | >600 | 575 | >600 |
| | | (5) Flame retardance Rank | V-0 | V-0 | V-0 | V-0 | V-0 | V-0 | V-0 | V-0 | V-0 | V-0 |

TABLE 3

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|---|---|
| Production method of resin composition | First raw material feeding inlet | Component (a-i) Parts by mass | 47 | 79 | 79 | 73 | 79 | 79 | 47 | 79 | 73 | 79 | 79 | 47 |
| | | Component (d) Parts by mass | 5 | 5 | 5 | 25 | 5 | 5 | 5 | 5 | 25 | 5 | 5 | 5 |
| | Second raw material feeding inlet | Component (b-i) Parts by mass | 53 | — | — | 27 | 10.5 | 10.5 | 53 | — | 27 | 10.5 | 10.5 | — |
| | | Component (b-v-x) Parts by mass | — | 21 | — | — | — | — | — | 21 | — | — | — | — |
| | | Component (b-vi-x) Parts by mass | — | — | 21 | — | — | — | — | — | — | — | — | 53 |
| | | Component (c-iii) Parts by mass | — | — | — | — | — | — | — | — | — | — | — | — |
| | | Component (c-vi-x) Parts by mass | — | — | — | — | 10.5 | — | — | — | — | — | — | — |
| | | Component (g-i) Parts by mass | — | — | — | — | — | 10.5 | — | — | — | 10.5 | — | — |
| | | Component (g-ii) Parts by mass | — | — | — | — | — | — | — | — | — | — | 10.5 | — |
| | | Component (f) Parts by mass | — | — | — | — | — | — | 5 | 5 | 5 | 5 | 5 | — |
| | Liquid addition pump | Component (e) Parts by mass | — | — | — | — | — | — | 18 | 18 | 18 | 18 | 18 | — |
| Evaluation | | Formation of continuous phase by (a) component | Poor | Good | Good | Good | Good | Good | Poor | Good | Good | Good | Good | Poor |
| | | Formation of worm-like domains by (b) component | Poor | Good | Good | Good | Good | Good | Poor | Good | Good | Good | Good | — |
| | | Average minor axis diameter of 2 μm or less and average major axis diameter/average minor axis diameter of 1 to 10 for (c) component | — | — | — | — | — | — | — | — | — | — | — | Poor |
| | | (1) Flexural modulus MPa | 1190 | 2270 | 2250 | 1330 | 2110 | 2090 | 1140 | 2200 | 1250 | 2080 | 2050 | 1200 |
| | | (2) Chemical resistance % | 1.38 | 1.11 | 1.13 | 1.09 | 1.09 | 1.10 | 1.29 | 1.05 | 1.00 | 0.94 | 0.98 | 1.50 |
| | | (3) Falling weight impact strength J | 9.2 | 3.1 | 3.2 | 2.9 | 1.8 | 1.9 | 8.0 | 2.7 | 2.4 | 1.7 | 1.7 | 10.1 |
| | | (4) Tracking resistance V | >600 | 500 | 500 | 575 | 550 | 550 | 575 | 400 | 550 | 550 | 550 | >600 |
| | | (5) Flame retardance Rank | — | — | — | — | — | — | V-2 | V-0 | V-2 | V-1 | V-1 | — |

TABLE 3-continued

| | | | Comparative Example 13 | Comparative Example 14 | Comparative Example 15 | Comparative Example 16 | Comparative Example 17 | Comparative Example 18 | Comparative Example 19 | Comparative Example 20 | Comparative Example 21 | Comparative Example 22 | Comparative Example 23 | Comparative Example 24 |
|---|---|---|---|---|---|---|---|---|---|---|---|---|---|---|
| Production method of resin composition | First raw material feeding inlet | Component (a-i) Parts by mass | 79 | 79 | 73 | 79 | 47 | 79 | 79 | 73 | 79 | 79 | 79 | 79 |
| | | Component (d) Parts by mass | 5 | 5 | 25 | 5 | 5 | 5 | 5 | 25 | 5 | 5 | 5 | 5 |
| | Second raw material feeding inlet | Component (b-i) Parts by mass | — | — | — | — | — | — | — | — | — | 10.5 | — | — |
| | | Component (b-v-x) Parts by mass | — | — | — | — | — | — | — | — | — | — | 10.5 | — |
| | | Component (b-vi-x) Parts by mass | — | — | — | — | — | — | — | — | — | — | — | 10.5 |
| | | Component (c-iii) Parts by mass | — | — | 27 | 10.5 | 53 | — | — | 27 | 21 | — | — | — |
| | | Component (c-vi-x) Parts by mass | — | 21 | — | 10.5 | — | — | 21 | — | — | 10.5 | 10.5 | 10.5 |
| | | Component (g-i) Parts by mass | — | — | — | — | — | — | — | — | 50 | — | — | — |
| | | Component (g-ii) Parts by mass | 21 | — | — | — | — | 21 | — | — | — | — | — | — |
| | | Component (f) Parts by mass | — | — | — | — | 5 | 5 | 5 | 5 | 5 | 5 | 5 | 5 |
| | Liquid addition pump | Component (e) Parts by mass | — | — | — | — | 18 | 18 | 18 | 18 | 18 | 18 | 18 | 18 |
| Evaluation | | Formation of continuous phase by (a) component | Good | Good | Good | Good | Poor | Good | Good | Good | Good | Good | Good | Good |
| | | Formation of worm-like domains by (b) component | — | — | — | — | Poor | — | — | — | — | — | — | — |
| | | Average minor axis diameter of 2 μm or less and average major axis diameter/average minor axis diameter of 1 to 10 for (c) component | Good | Good | Good | Good | Poor | Good | Good | Good | Good | Good | Good | Good |
| | | (1) Flexural modulus MPa | 2250 | 2210 | 1280 | 2090 | 1150 | 2170 | 2060 | 1230 | 2010 | 2180 | 2150 | 2170 |
| | | (2) Chemical resistance % | 1.15 | 1.17 | 1.29 | 1.18 | 1.40 | 1.09 | 1.09 | 1.2 | 1.12 | 1.15 | 0.99 | 1.03 |
| | | (3) Falling weight impact strength J | 2.9 | 3.2 | 3.0 | 1.9 | 9.0 | 2.6 | 2.9 | 1.9 | 1.7 | 3.4 | 2.1 | 2.3 |
| | | (4) Tracking resistance V | 500 | 500 | 575 | 500 | 575 | 450 | 500 | 550 | 500 | 475 | 400 | 425 |
| | | (5) Flame retardance Rank | — | — | — | — | V-2 | V-0 | V-1 | V-1 | V-1 | V-0 | V-0 | V-0 |

As can be seen from Tables 2 and 3, the resin compositions of the examples had excellent low-temperature impact resistance, chemical resistance, and tracking resistance compared to the resin compositions of the comparative examples, and had rigidity enabling adoption for mechanism components and structures.

INDUSTRIAL APPLICABILITY

According to the present disclosure, it is possible to obtain a resin composition and a shaped product that have excellent low-temperature impact resistance, chemical resistance, and tracking resistance, and have rigidity enabling adoption for mechanism components and structures. Shaped products containing the resin composition of the present disclosure are suitable for use as automotive components, interior and exterior components of electrical devices, various other components, and so forth.

The invention claimed is:

1. A resin composition comprising:
   (a) a polyphenylene ether resin;
   (b-1) a hydrogenated block copolymer, and/or modified product thereof, that is an at least partially hydrogenated product of a block copolymer including at least one polymer block A of mainly a vinyl aromatic compound and at least one polymer block B of mainly a conjugated diene compound and that has a peak molecular weight of 80,000 to 200,000 as measured as a standard polystyrene equivalent value by GPC;
   (b-2) a hydrogenated block copolymer, and/or modified product thereof, that is an at least partially hydrogenated product of a block copolymer including at least one polymer block A of mainly a vinyl aromatic compound and at least one polymer block B of mainly a conjugated diene compound and that has a peak molecular weight of at least 10,000 and less than 80,000 as measured as a standard polystyrene equivalent value by GPC; and
   (c) an olefinic polymer formed from an olefin other than propylene, wherein
   the (a) component forms a continuous phase,
   the polymer block B in the (b-1) component and the polymer block B in the (b-2) component have a glass transition temperature of −50° C. or lower,
   the (c) component has a brittleness temperature of 50° C. or lower,
   the resin composition does not substantially contain (g) a polypropylene resin, and
   the resin composition has a flexural modulus of 1,600 MPa or more as measured in accordance with ISO 178.

2. The resin composition according to claim 1, wherein a ratio (b-1):(b-2) of the (b-1) component and the (b-2) component is 10:90 to 50:50.

3. The resin composition according to claim 1, further comprising
   (d) a compatibilizer.

4. The resin composition according to claim 1, wherein the (b-1) component and/or the (b-2) component forms a worm-like domain.

5. The resin composition according to claim 1, wherein the (c) component is dispersed in the resin composition with an average minor axis diameter of 2 μm or less and average major axis diameter/average minor axis diameter of 1 to 10.

6. The resin composition according to claim 1, further comprising
   (e) a phosphate ester compound.

7. The resin composition according to claim 1, further comprising
   (f) a phosphinate salt, wherein
   the (f) component includes at least one phosphinate salt selected from the group consisting of:
   a phosphinate salt represented by general formula (1), shown below,

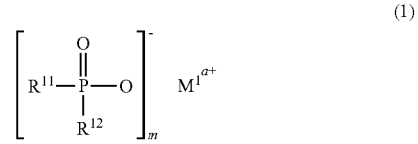

where $R^{11}$ and $R^{12}$ are each, independently of one another, a linear or branched alkyl group having a carbon number of 1 to 6 and/or an aryl group having a carbon number of 6 to 10, $M^1$ is at least one selected from the group consisting of a calcium ion, a magnesium ion, an aluminum ion, a zinc ion, a bismuth ion, a manganese ion, a sodium ion, a potassium ion, and a protonated nitrogenous base, a is an integer of 1 to 3, m is an integer of 1 to 3, and a=m; and
   a diphosphinate salt represented by formula (2), shown below,

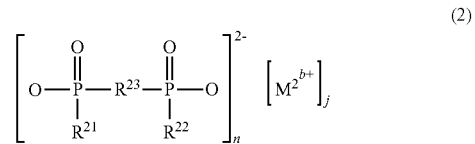

where $R^{21}$ and $R^{22}$ are each, independently of one another, a linear or branched alkyl group having a carbon number of 1 to 6 and/or an aryl group having a carbon number of 6 to 10, $R^{23}$ is a linear or branched alkylene group having a carbon number of 1 to 10, an arylene group having a carbon number of 6 to 10, an alkylarylene group having a carbon number of 6 to 10, or an arylalkylene group having a carbon number of 6 to 10, $M^2$ is at least one selected from the group consisting of a calcium ion, a magnesium ion, an aluminum ion, a zinc ion, a bismuth ion, a manganese ion, a sodium ion, a potassium ion, and a protonated nitrogenous base, b is an integer of 1 to 3, n is an integer of 1 to 3, j is an integer of 1 or 2, and b·j=2n.

8. The resin composition according to claim 1, wherein the (c) component is an ethylene-1-butene copolymer.

9. The resin composition according to claim 1, wherein the (c) component has a density of 0.87 g/cm³ or more.

10. The resin composition according to claim 1, wherein the (c) component has a density of 0.90 g/cm³ or more.

11. The resin composition according to claim 3, wherein the (d) component is a hydrogenated block copolymer, and/or modified product thereof, that is an at least partially hydrogenated product of a block copolymer including at least one polymer block I of mainly a vinyl aromatic compound and at least one polymer block II of mainly a conjugated diene compound,
   total content of 1,2-vinyl bonds and 3,4-vinyl bonds relative to double bonds in conjugated diene compound units included in the (d) component is more than 50% and not more than 90%, the (d) component has a vinyl aromatic compound unit content of 30 mass % to 50 mass %, the polymer block II in the (d) component has a glass transition temperature of higher than −50° C., and percentage hydrogenation of double bonds in conjugated diene compound units included in the (d) component is 80% to 100%.

12. A method of producing the resin composition according to claim 1, comprising:

a step (1-1) of melt-kneading the (a) component and also the (d) component as necessary to obtain a kneaded product; and a step (1-2) of adding the (b-1) component, the (b-2) component, and the (c) component to the kneaded product obtained in step (1-1) and performing melt-kneading thereof.

13. A shaped product comprising the resin composition according to claim 1.

14. The resin composition according to claim 1, wherein a content of the (a) component is from 50 parts by mass to 90 parts by mass, a content of the (b-1) and (b-2) components in total is from above 0 parts by mass to 30 parts by mass, and a content of the (c) component is from above 0 parts by mass to 30 parts by mass relative to 100 parts by mass, in total, of the (a) to (c) components.

15. The resin composition according to claim 1, wherein a content of the (a) component is from 50 parts by mass to 90 parts by mass, a content of the (b-1) and (b-2) components in total is from 2.23 parts by mass to 30 parts by mass, and a content of the (c) component is from 2.23 parts by mass to 30 parts by mass relative to 100 parts by mass, in total, of the (a) to (c) components.

16. A method of producing the resin composition according to claim 3, comprising:

a step (1-1) of melt-kneading the (a) component and also the (d) component as necessary to obtain a kneaded product; and a step (1-2) of adding the (b-1) component, the (b-2) component, and the (c) component to the kneaded product obtained in step (1-1) and performing melt-kneading thereof.

* * * * *